United States Patent [19]

Shiragami et al.

[11] Patent Number: 5,228,020
[45] Date of Patent: Jul. 13, 1993

[54] SYSTEM FOR DETECTING ROTATIONAL DEVIATION OF A ROTARY RECORDING MEDIUM AND AN APPARATUS FOR REPRODUCING A SIGNAL FROM THE RECORDING MEDIUM

[75] Inventors: Kazuharu Shiragami, Hirakata; Mitsuro Moriya, Neyagawa; Hiroyuki Yamaguchi, Hirakata, all of Japan

[73] Assignee: Matsushita Electric Industrial Co., Ltd., Osaka, Japan

[21] Appl. No.: 571,826

[22] Filed: Aug. 23, 1990

Related U.S. Application Data

[60] Continuation of Ser. No. 306,297, Feb. 6, 1989, abandoned, which is a division of Ser. No. 822,856, Jan. 27, 1986, Pat. No. 4,833,664.

[30] Foreign Application Priority Data

Jan. 31, 1985 [JP] Japan .................................. 60-17898
Jul. 18, 1985 [JP] Japan .................................. 60-159032

[51] Int. Cl.⁵ .......................... G11B 7/00; G11B 19/24
[52] U.S. Cl. .................................... 369/50; 360/73.03; 358/342
[58] Field of Search ............... 369/50, 58, 47, 32, 369/44, 26, 54, 44, 34; 360/73.03; 358/314, 321, 322, 337, 338, 342

[56] References Cited

U.S. PATENT DOCUMENTS

| | | | |
|---|---|---|---|
| 4,388,713 | 6/1983 | Tatsuguchi | 369/50 |
| 4,403,259 | 9/1983 | Masaki | 369/43 |
| 4,530,083 | 7/1985 | Ishihara | 369/41 |
| 4,542,423 | 9/1985 | Kotake et al. | 360/73.03 |
| 4,555,736 | 11/1985 | Mathieu et al. | 358/342 |
| 4,575,835 | 3/1986 | Nishikawa et al. | 369/50 |
| 4,580,253 | 4/1986 | Yoshitome | 369/32 |
| 4,641,294 | 3/1987 | Yoshimaru | 369/50 |
| 4,761,772 | 8/1988 | Marakami | 369/41 VR |
| 4,984,227 | 1/1991 | Yoshimaru | 369/58 |

Primary Examiner—W. R. Young
Assistant Examiner—Thang V. Tran
Attorney, Agent, or Firm—Stevens, Davis, Miller & Mosher

[57] ABSTRACT

During the storing of a tracking error signal and an index detection signal in memories in relation to rotating means for a recording medium, an error is detected when the number of index detection signals is other than one and afrer the storing of the signal in the memory the missing reproduced index detection signal is interpolated in accordance with the index signal stored in the memory. Also, the stored index detection signal and the reproduced index detection signal are compared in phase so as to determine whether the stored tracking error signal is to be applied to a tracking control system. The memory for storing tracking error signal and the memory for storing index detection signal are combined in one unit.

6 Claims, 16 Drawing Sheets

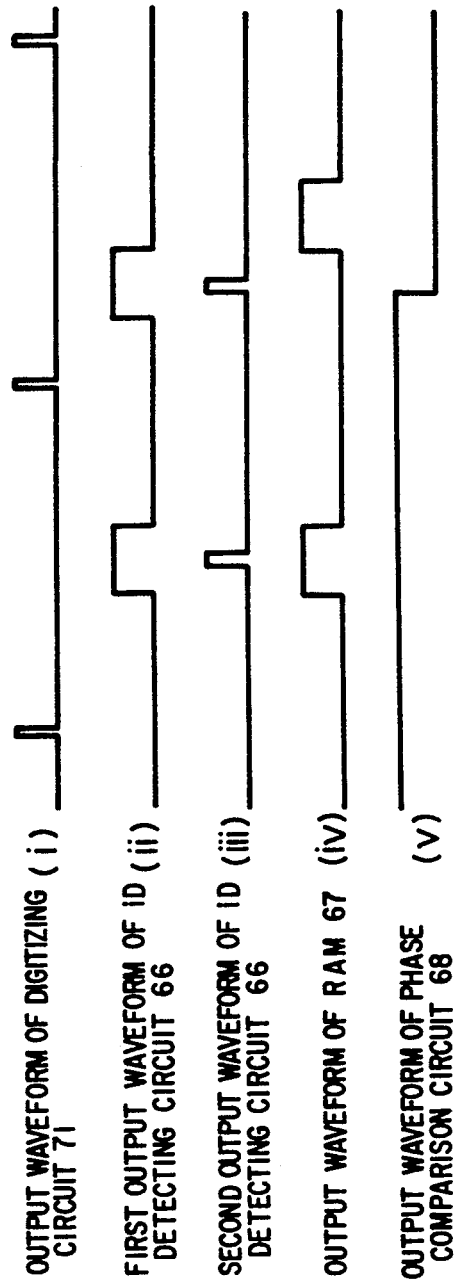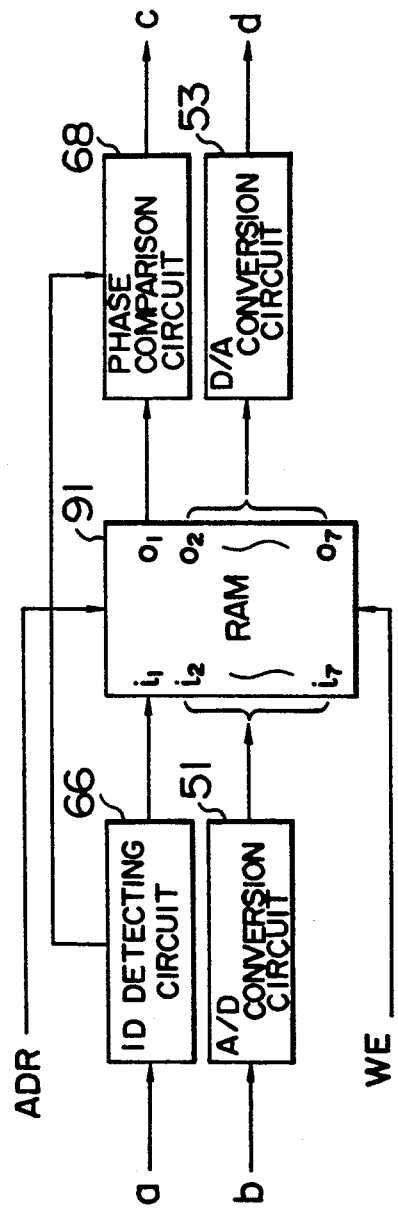

5,228,020

SYSTEM FOR DETECTING ROTATIONAL DEVIATION OF A ROTARY RECORDING MEDIUM AND AN APPARATUS FOR REPRODUCING A SIGNAL FROM THE RECORDING MEDIUM

This application is a Continuation of application Ser. No. 306,297, filed Feb. 6, 1989, now abandoned, which in turn is a Divisional of application Ser. No. 822,856, filed Jan. 27, 1986, now U.S. Pat. No. 4,833,664.

BACKGROUND OF THE INVENTION

The present invention relates to an information recording and reproducing apparatus including signal conversion means for recording or reproducing information from a disc-shaped recording medium including tracks on which information has been recorded or a spiral track on which information is to be recorded.

High-density recording techniques have recently been known in the art in which a disc is formed by using a light-sensitive recording material and, while rotating the disc, a beam of light such as laser is converged into a tiny spot of less than 1 μm in diameter and then projected onto the disc thereby accomplishing high-density recording of signals in the form of variations, e.g., white/dark variations, hole or pit variations or intensity variations on the disc or reproducing such signals.

For instance, included among these known techniques are optical video discs which are well known as apparatus for reproducing the signals recorded at high density on the discs.

Also, the above-mentioned signal recording technique is utilized in the production of a master for video discs.

As regards the form of signals to be recorded, the recording of video signals, sound signals, digital signals and the like has been conceived.

In the above-mentioned optical information recording and reproducing apparatus, the recording of a signal is effected by projecting a laser beam onto the recording thin film on the disc so that the area of the thin film exposed to the laser beam is fused and evaporated or the reflectance or transmittance of the thin film is changed. In other words, it is the usual practice to change the optical characteristic of the recording material by thermally utilizing the energy of the laser beam.

To accomplish high track-density recording of the optical recording disc, the disc is preliminarily formed with guide tracks of a groove structure and signals are recorded while performing a tracking control on the guide tracks. The guide tracks have the effect of reducing the positional deviation of the recording laser beam due to vibrations of the apparatus and allowing recording of signals in any selected locations of the optical recording disc.

Also, by recording a specific address to each of the tracks during the master cutting of the optical recording disc, it is possible to randomly search any given one of all the tracks on the optical recording disc.

The guide tracks are selected in accordance with the contents of information or signals to be recorded and generally the tracks are formed in the spiral or concentric form with respect to the center of the disc.

As regards the track form, the spiral track is more advantageous than the concentric tracks from the track density point of view. The reason is that the track feed accuracy of the master cutting machine is such that the occurrence of vibrations due to the track feed is eliminated and the effect of backlash of the feed screw mechanism is reduced in the case of the spiral track requiring the continuous feed than in the case of the concentric tracks requiring the intermittent feed.

However, in the case of the optical recording disc employing the spiral track, differing from the concentric tracks, the track is a single continuous one on the optical recording disc and therefore it is difficult to hold the optical head on the track of a desired address as compared with the concentric tracks. With the spiral track, in order to perform a tracking control concentrically on any given track of the same address, it is necessary to force the beam spot from the optical head to skip or jump by one track. In this case, in response to the detection of a rotational position signal (hereinafter referred to as an index signal) preliminarily provided on the track in the tracking mode, a jumping signal of a predetermined amplitude is externally applied to the optical head and it is shifted in the radial direction of the optical recording disc. Thus, when the optical head moves away from the current track and comes onto the next guide track, braking is applied to the optical head and thus it performs a still picture operation of reproducing again the previously reproduced track.

With the above-described construction, however, when a flaw is caused or foreign particles are deposited on the index portion preliminarily formed on the track, a dropout occurs in the reproduced signals thus failing to detect the index signal. When this occurs, the optical head cannot perform the still picture operation since it reproduces the next track due to the track being spiral in form.

SUMMARY OF THE INVENTION

It is an object of the present invention to provide an information recording and reproducing apparatus capable of continuously recording or reproducing information from any given track of a recording medium including a spiral track.

To accomplish the above object, in accordance with the invention there is thus provided an information recording and reproducing apparatus including rotating means for rotating a recording medium including a spiral track having signals recorded thereon or for recording signals thereon, the track having recorded thereon rotation position signals each indicating a rotational position, signal conversion means for reproducing a signal from the recording medium or recording a signal on the recording medium, rotational position detecting means responsive to the reproduced signal from the signal conversion means to detect the rotational position signal, and memory means for storing the detection signal from the rotational position detecting means, whereby when the detection signal from the rotational position detecting means is missing, the missing detection signal of the rotational position detecting means is interpolated in accordance with the stored signal in the memory means.

BRIEF DESCRIPTION OF THE DRAWINGS

FIG. 16 shows various waveforms useful for explaining the operation of the phase comparison circuit in FIG. 15.

FIGS. 17 and 18 are block diagrams showing still another embodiment of the invention.

DESCRIPTION OF THE PREFERRED EMBODIMENTS

The present invention will now be described with reference to the drawings.

Figure 1:
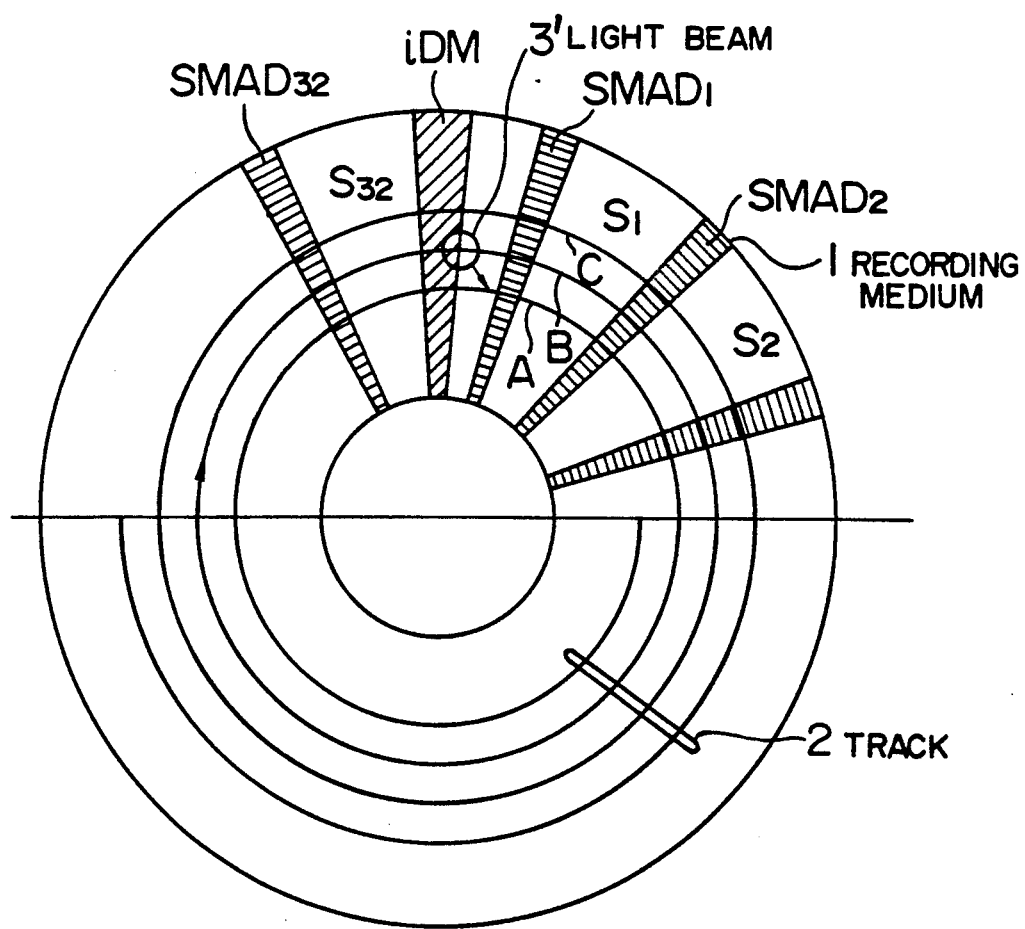
FIG. 1 is a diagram useful for explaining the track jumping operation of an information recording and reproducing apparatus according to the invention.

Referring to FIG. 1 illustrating an example of a track jumping according to the invention, numeral 1 designates a recording medium including a track 2 composed of tracks A, B and C in spiral form and circling from the inner periphery toward the outer periphery and preliminarily formed with information recording sector areas $S_1$ to $S_{32}$, an index mark area iDM indicating track address switches (rotational position signals) and sector mark / address areas $SMAD_1$ to $SMAD_{32}$ indicating sector marks for separating the sector areas and track addresses.

Numeral 3' designates the light beam from an optical head which in the Figure is reproducing the track while tracking the track of an address signal A. When the light beam 3' reproduces the index mark area IDM thus detecting the index mark, the light beam 3' is rapidly moved radially inwardly of the recording medium 1. Thus, the light beam 3' is jumped by an amount corresponding to one track and the still picture operation of continuously reproducing the track of the desired address A is performed.

Figure 2:
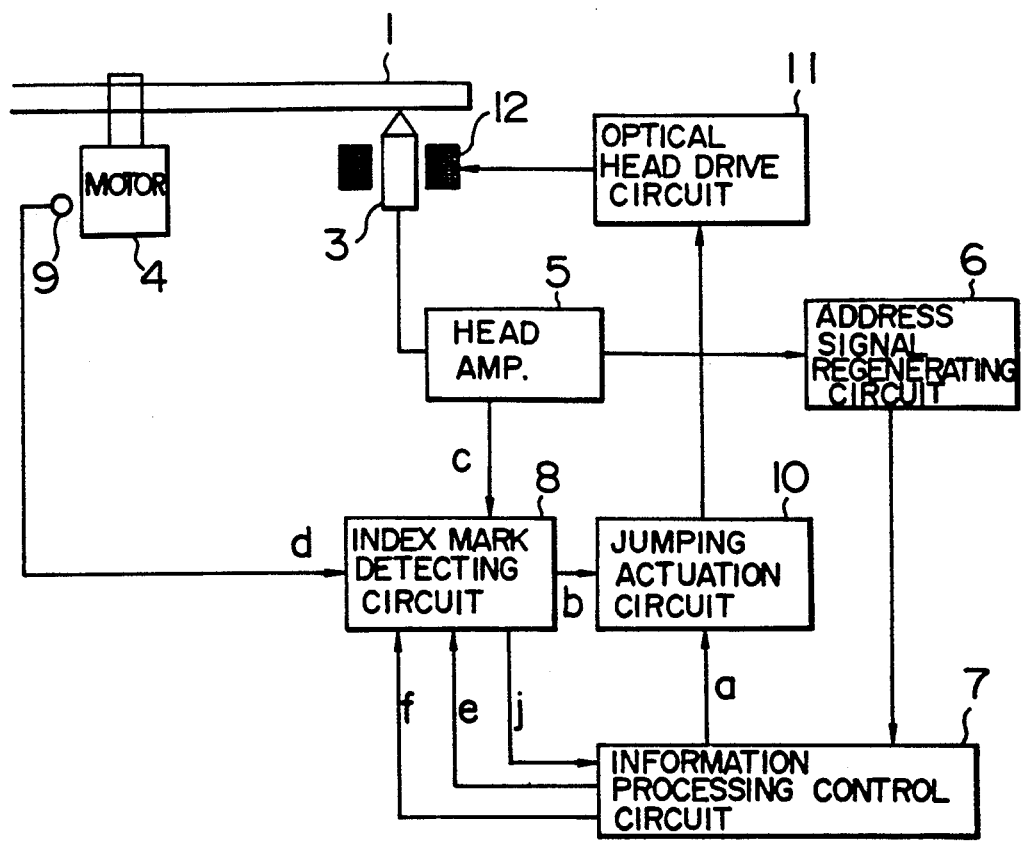
FIG. 2 is a block diagram showing an embodiment of the jumping control system.

FIG. 2 is a block diagram showing an embodiment of the above-mentioned jumping control system. The recording medium 1 is rotated by a motor 4. The reproduced signal generated from an optical head 3 is amplified by a head amplifier 5, demodulated by an address signal regenerating circuit 6 and received by an information processing control unit 7.

The output of the head amplifier 5 is also applied to an index mark detecting circuit 8. A position detecting element 9 is attached to the motor 4 so that a single pulse signal is generated for every rotation of the recording medium 1 and the signal is sent to the index mark detecting circuit 8 so that the resulting index signal (a line b) is applied to a jumping actuation circuit 10.

When a still picture command signal (a line a) is applied from the information processing control unit 7, the jumping actuation circuit 10 generates a pulse in synchronism with the index signal (the line b). This pulse energizes a tracking drive coil 12 of the optical head 3 through an optical head drive circuit 11 and thus the light beam output of the optical head 3 is moved radially inwardly of the recording medium 1 by one track.

Figure 3:
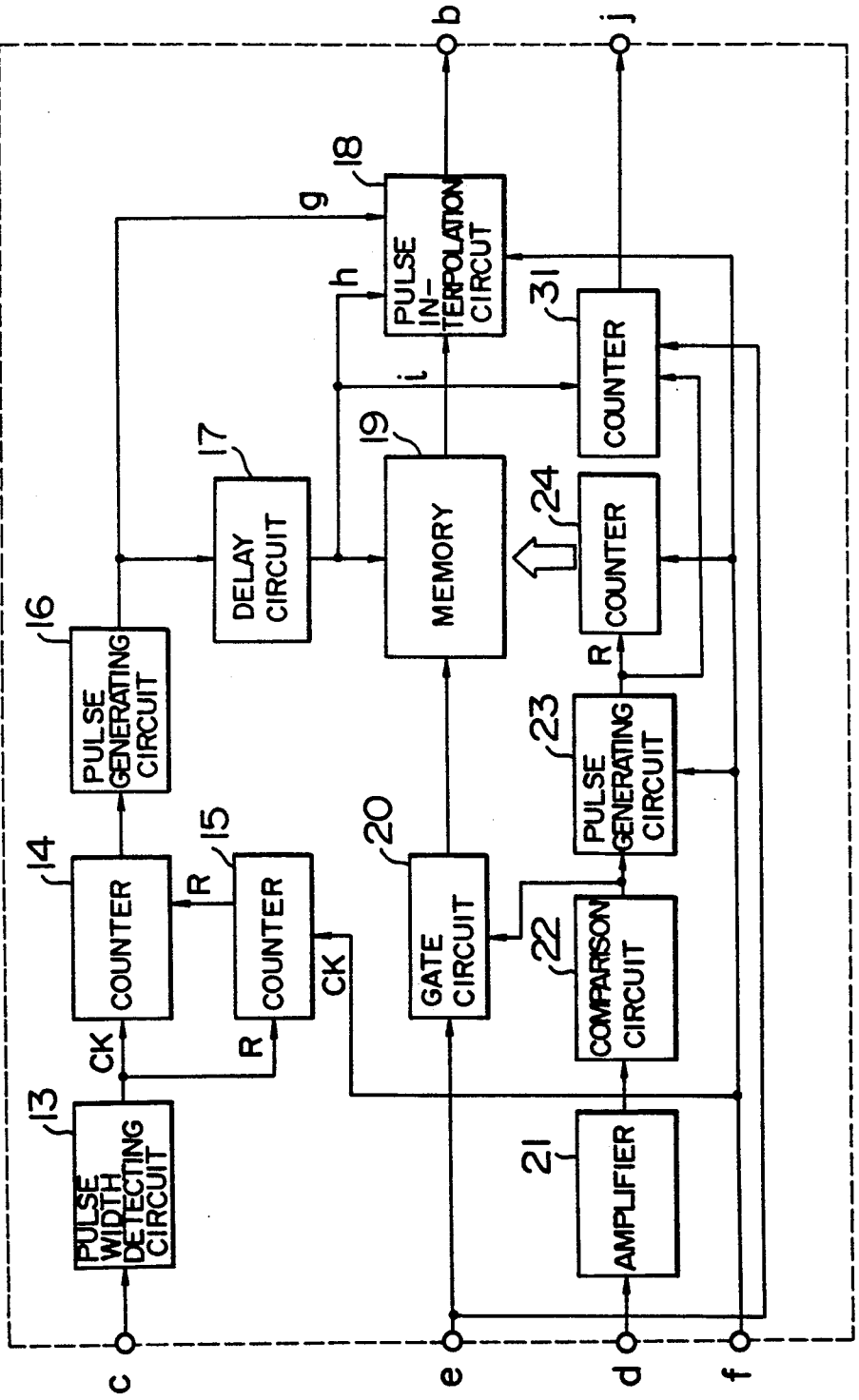
FIG. 3 is a block diagram showing an embodiment of the index mark detecting circuit in FIG. 2.

FIG. 3 is a block diagram showing an embodiment of the index mark detecting circuit 8 in FIG. 2. The signal (a line c) or the index mark IDM applied from the head amplifier 5 of FIG. 2 comprises a signal of a short "1"–"0" or pulse repetition period. Numeral 13 designates a pulse width detecting circuit for detecting the short repetition period signal of the index mark iDM, 14 a counter for counting the number of pulse detected by the pulse width detecting circuit 13, and 15 a counter for counting the pulse width of an output signal from the pulse width detecting circuit 13. The counter 15 is connected to the reset terminal of the counter 14 so that when the count of the counter 15 exceeds a predetermined value, the counter 14 is cleared.

Numeral 16 designates a pulse generating circuit for generating a pulse each time the count of the counter 14 exceeds a predetermined value.

In other words, when the pulse width detecting circuit 13 detects the successively applied short-period pulse signals (the line c) or when the predetermined value of the counter 14 is exceeded, the pulse generating circuit 16 generates a pulse signal thus detecting the signal of the index mark iDM (hereinafter referred to as an index mark).

The counter 15 is provided to clear the counter 14 when the pulse width detecting circuit 13 does not successively detect pulses.

The pulse generated from the pulse generating circuit 16 is applied to a delay circuit 17 and simultaneously it is applied to a pulse interpolation circuit 18. The delay circuit 17 delays the applied input signal and its delayed output signal is applied to a memory 19, a counter 31 and the pulse interpolation circuit 18. Also, the pulse interpolation circuit 18 sends its output signal (the line b) to the jumping actuation circuit 10 of FIG. 2.

Numeral 20 designates a gate circuit for receiving a signal (a line e) applied as a write start command for the memory 19 from the information processing control unit 7 and a binary signal produced by amplifying the output signal (a line d) of the position detecting element 9 of FIG. 2 by an amplifier 21 and comparing the thus amplified signal with a reference signal by a comparison circuit 22 so as to generate and apply a write signal to the memory 19. The output signal of the comparison circuit is also reshaped by a pulse generating circuit 23 which in turn applies its output pulse to the reset terminal of a counter 24 and the counter 31. The counter 24 counts the clock signals (a line f) applied from the information processing control unit 7 of FIG. 2 and its count is applied to the memory 19.

Utilizing the signal applied from the counter 24 as an address value, the memory 19 stores the signal from the delay circuit 17 in response to the command signal from the gate circuit 20. The thus stored signal (a line i) from the delay circuit 17 is applied to the pulse interpolation circuit 18. The counter 31 counts the signal to the memory 19 and its count data (a line j) is sent to the information processing control unit 7.

Figure 4:
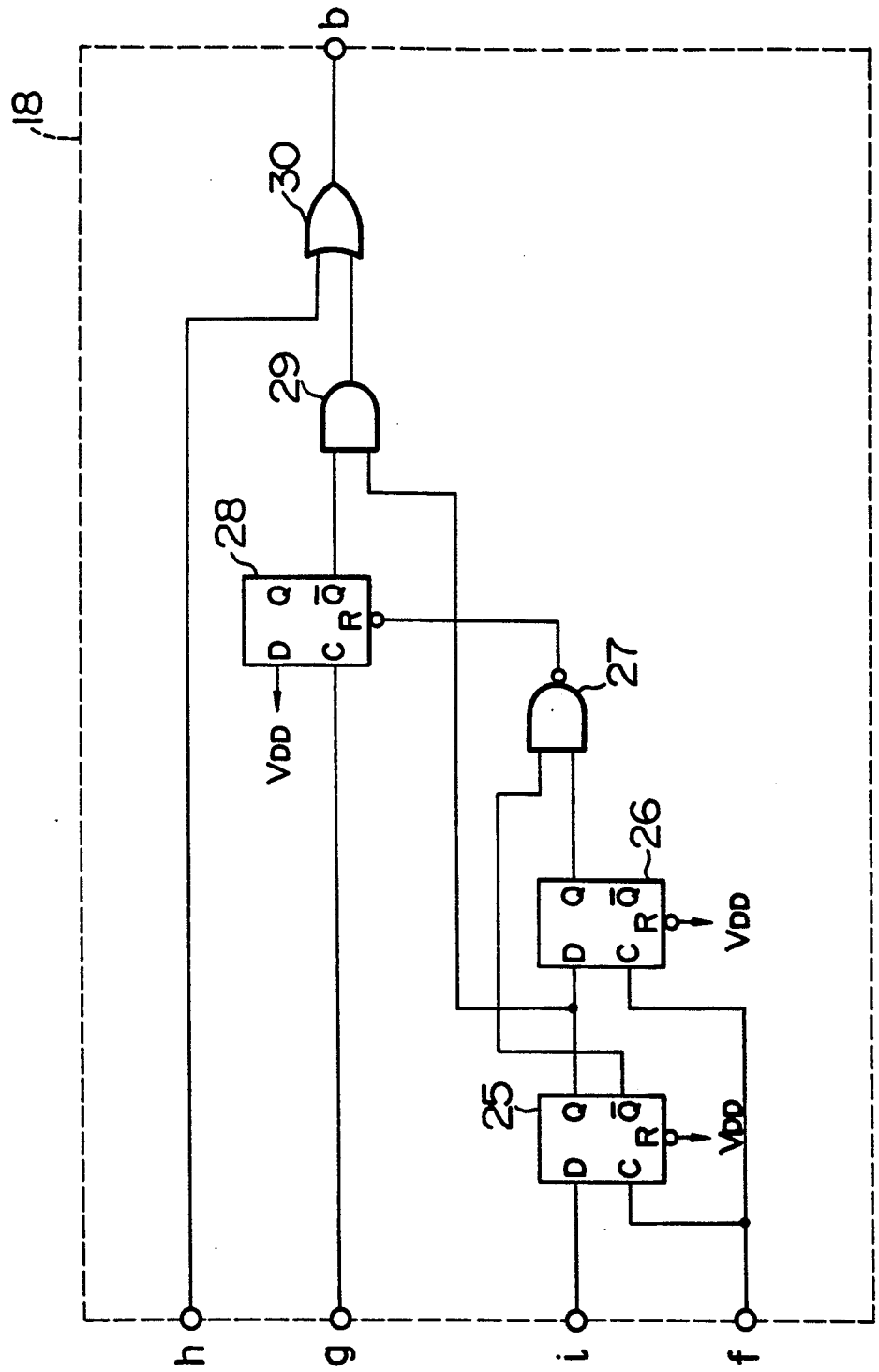
FIG. 4 is a circuit diagram showing an embodiment of the pulse interpolation circuit in FIG. 3.

FIG. 4 is a circuit diagram showing an embodiment of the pulse interpolation circuit 18. Numeral 25 designates a flip-flop whose D terminal receives the output signal (the line i) from the memory 19 of FIG. 3 and whose Q output is applied to the D terminal of a flip-flop 26 and one input of an AND circuit 29. The clock signal (the line f) from the information processing control unit 7 of FIG. 2 is applied to the C terminal of the flip-flops 25 and 26, respectively. The $\overline{Q}$ output of the flip-flop 25 is connected to one input of a NAND circuit 27. The Q output of the flip-flop 26 is connected to the other input of the AND circuit 29 and the output of the NAND circuit 27 is connected to the reset terminal R of a flip-flop 28. The D terminal of the flip-flop 28 is connected to a power supply $V_{DD}$ and its clock terminal C receives the output signal (a line g) from the pulse generating circuit 16 of FIG. 3. The $\overline{Q}$ output of the flip-flop 28 is applied to the other input of the AND circuit 29 and the output of the AND circuit 29 is applied to one input of an OR circuit 30 whose other input receives the output signal (a line h) of the delay circuit 17 of FIG. 3. The output signal (the line b) of the OR circuit 30 is sent as an output signal of the index mark detecting circuit 8 in FIG. 3 to the jumping actuation circuit 10 of FIG. 2.

Figure 5:
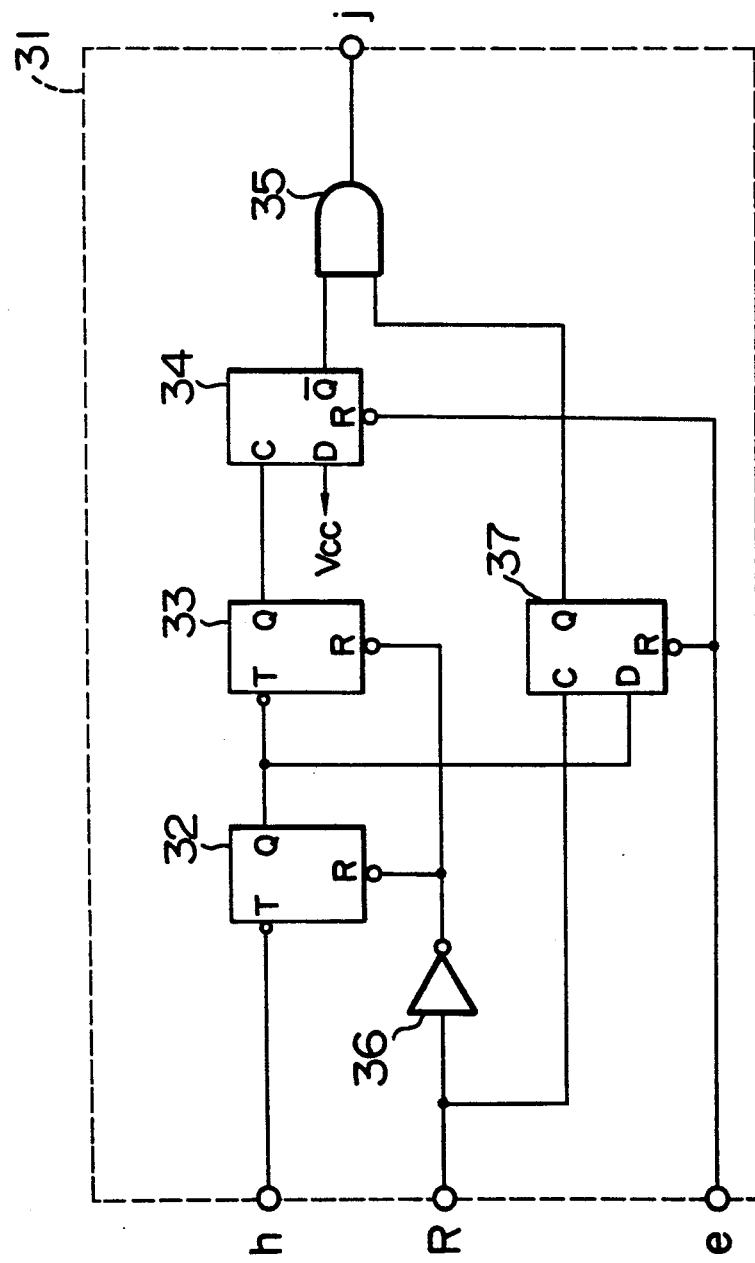
FIG. 5 is a circuit diagram showing an embodiment of the counter in FIG. 3.

FIG. 5 is a detailed circuit diagram of the counter 31 of FIG. 3. Numeral 32 designates a flip-flop whose T terminal receives the output signal (the line h) of the delay circuit 17 in FIG. 3 and whose Q output is connected to the T terminal of a flip-flop 33 and the D terminal of a flip-flop 37, respectively. The Q output of the flip-flop 33 is connected to the C terminal of a flip-flop 34 and the $\overline{Q}$ output of the flip-flop 34 is connected to one input of an AND circuit 35. Also, the Q output of the flip-flop 37 is connected to the other input of the AND circuit 35. The output signal (a line R) generated from the pulse generating circuit 23 of FIG. 3 is applied to an inverter 36 and the C terminal of the flip-flop 37 and the output of the inverter 36 is connected to the R input terminal of the flip-flops 32 and 33, respectively. The output signal (the line j) of the AND circuit 35 is applied to the information processing control unit 7 of FIG. 2 and the D input terminal of the flip-flop 34 is connected to a power supply $V_{CC}$.

With the construction described above, the operation of the information recording and reproducing apparatus according to the first embodiment will now be described.

In the reproduction mode of operation in which the signals recorded on the recording medium 1 are reproduced by the optical head 3, the information processing control unit 7 of FIG. 2 first sends a memory write start command (the line e) to the index mark detecting circuit 8. When this occurs, the gate circuit 20 applies a logic "1" to the memory 19 during the interval between the first and second pulse signals d each generated from the position detecting element 9 for every rotation of the recording medium 1 and applied through the amplifier 21 and the comparison circuit 23. This places the memory 19 in the write mode and it stores the output signal from the delay circuit 17.

The index mark detecting method will now be described. When the index area (iDM) of the recording medium 1 is reproduced by the optical head 3, a signal is reproduced in accordance with the irregularities in the index area so that the signal is amplified by the head amplifier 5 and then applied to the pulse width detecting circuit 13 of FIG. 3. The pulse width detecting circuit 13 detects the pulse width of each applied pulse so that a pulse is generated if it is equal to the pulse width of the index mark and no pulse is generated if it is not. The pulses generated from the pulse width generating circuit 13 are counted by the counter 14 so that when a predetermined number of the pulses are applied successively, the counter 14 sends a signal to the pulse generating circuit 16 and an index mark pulse is generated from the pulse generating circuit 16. When a signal other than the index mark is detected by the pulse width detecting circuit 13 so that no pulses are successively detected by the pulse width detecting circuit 13, the counter 15 generates an output signal to reset the counter 14. In this way, the index mark can be accurately detected from the reproduced signal from the recording medium 1.

The signal generated from the pulse generating circuit 16 is delayed by the delay circuit 17 and it is then stored in the memory 19.

Figure 6:
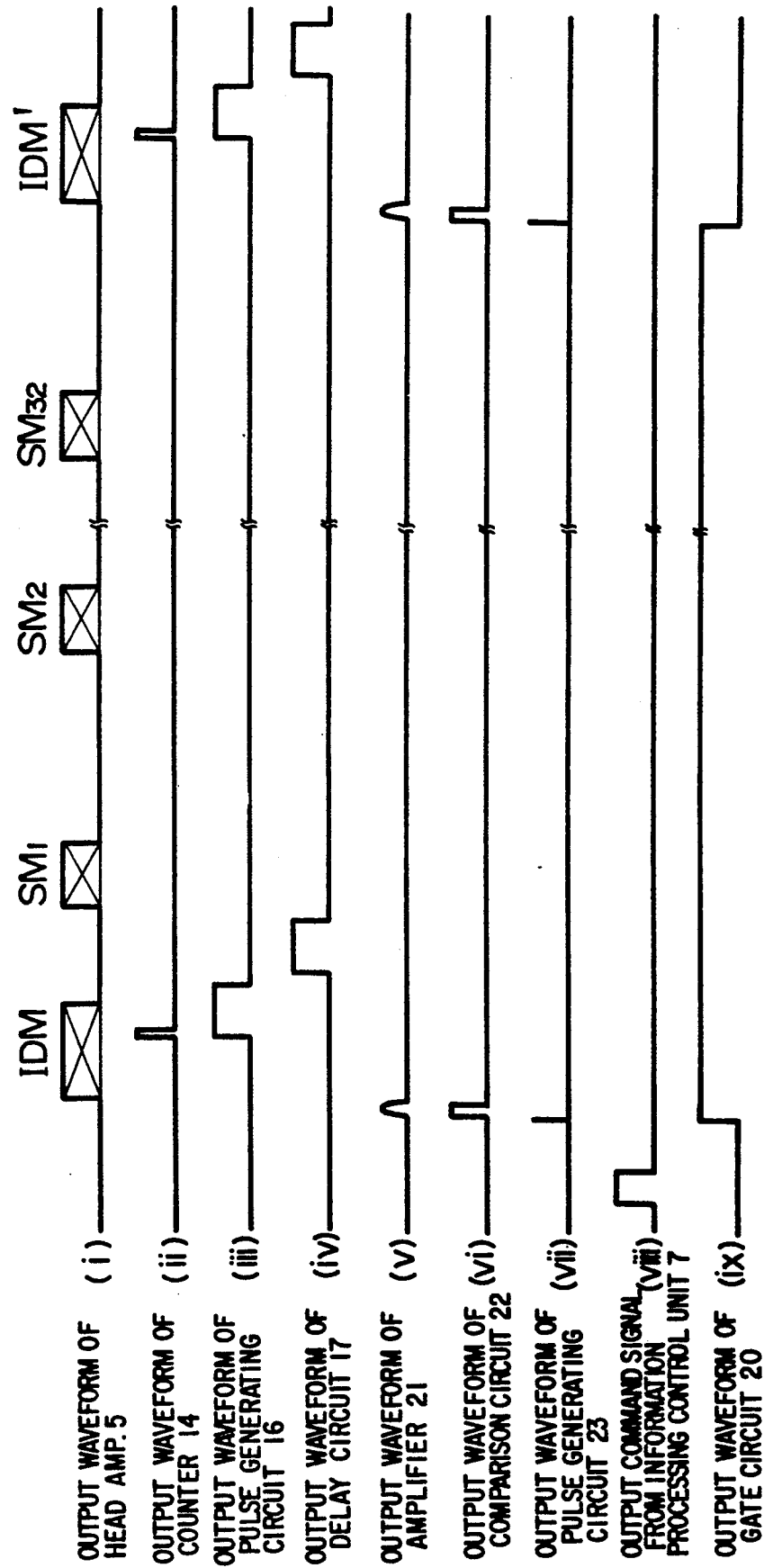
FIGS. 6 and 7 show various waveforms useful for explaining the operation of the invention.

Thus, the memory 19 stores, for one revolution of the recording medium 1, the resulting delayed signal of the index pulse produced by the reproduction of the recording medium 1 with a relative relation with the signal generated from the position detecting element 9. FIG. 6 shows various waveforms illustrating this operation. In the Figure, (i) shows the output waveform from the head amplifier 5 of FIG. 2, (ii) the output waveform from the counter 14 of FIG. 3, (iii) the output waveform of the pulse generating circuit 16, (iv) the output waveform of the delay circuit 17, (v) the output waveform of the amplifier 21, (vi) the output waveform of the comparison circuit 22, (vii) the output waveform of the pulse generating circuit 23, (viii) the output command signal from the information processing control unit 7 of FIG. 2, and (ix) the output waveform of the gate circuit 20.

Figure 7:
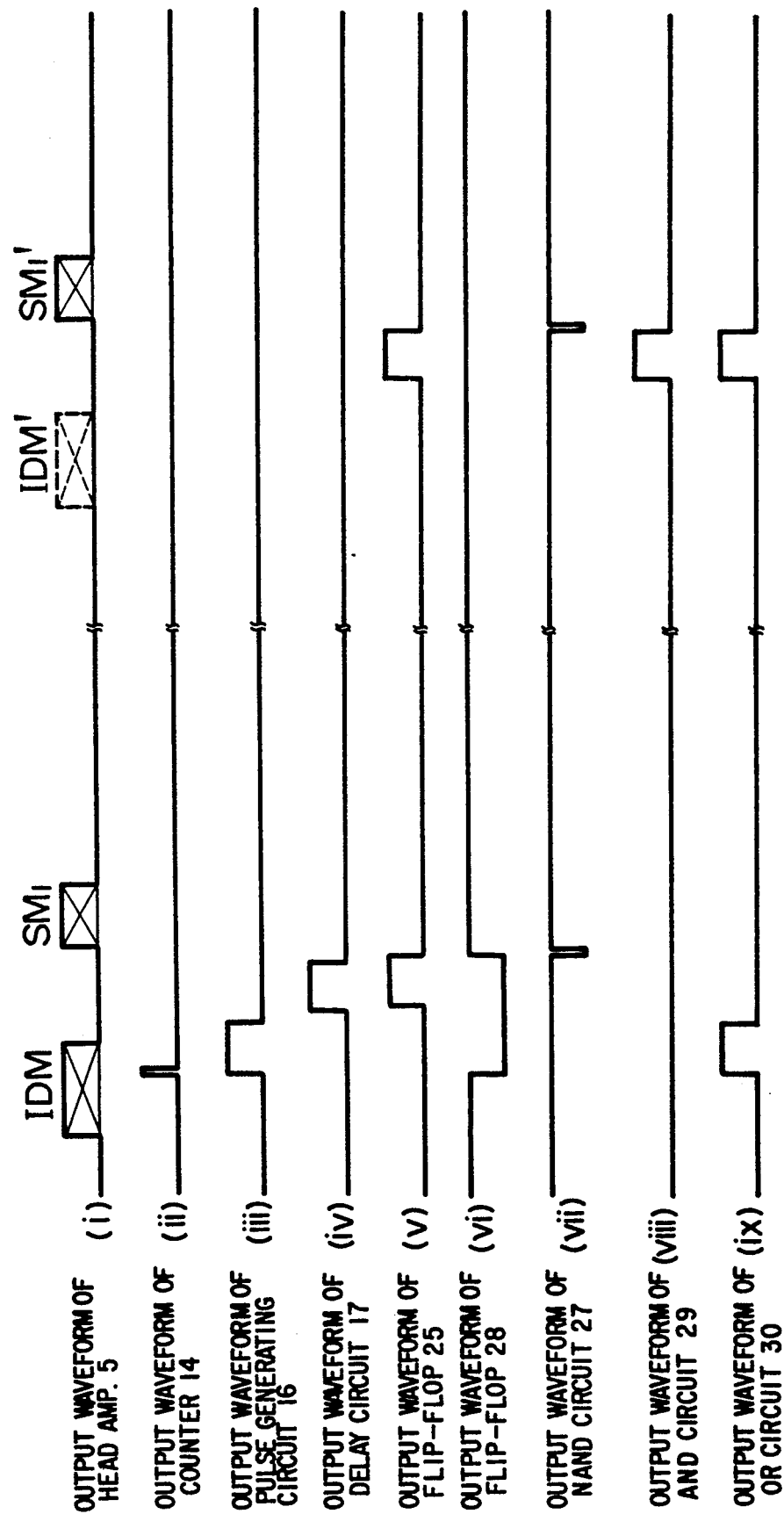
Figure 9:
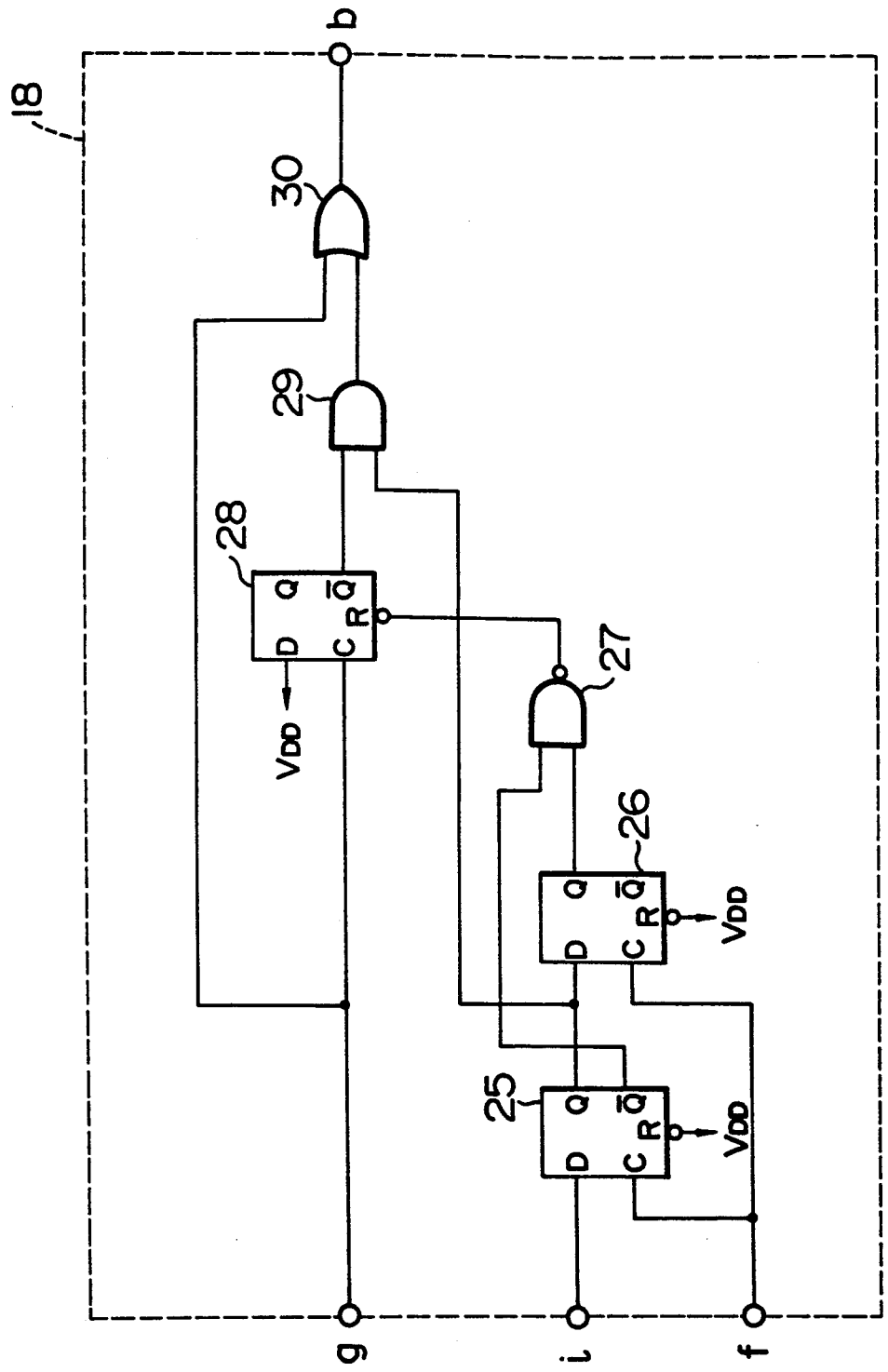
FIG. 9 is a circuit diagram showing an embodiment of the pulse interpolation circuit in the apparatus according to the second embodiment of the invention.

After the index pulse has been stored in the memory 19 in this way, if the index mark (IDM in (i) of FIG. 7) or the output signal of the head amplifier 5 of FIG. 2 is missing as shown by the broken line in (i) of FIG. 7, the flip-flop 28 of FIG. 9 is not set so that its output $\overline{Q}$ remains at the logic "1" and the signal (the line i) read from the memory 19 of FIG. 3 is delivered onto the line b through the flip-flop 25, the AND circuit 29 and the OR circuit 30. FIG. 7 shows various waveforms illustrating this operation. In the Figure, (i) shows the output waveform from the head amplifier 5 of FIG. 2, (ii) the output waveform from the counter 14 of FIG. 3, (iii) the output waveform of the pulse generating circuit 16, (iv) the output waveform of the delay circuit 17, (v) the output waveform from the Q terminal of the flip-flop 25 of FIG. 4, (vi) the output waveform from the $\overline{Q}$ terminal of the flip-flop 28, (vii) the output signal of the NAND circuit 27, (viii) the output signal of the AND circuit 29, and (ix) the output signal of the OR circuit 30.

Thus, the index signal interpolated by the signal generated from the memory 19 is applied to the jumping actuation circuit 10 of FIG. 2.

Figure 8:
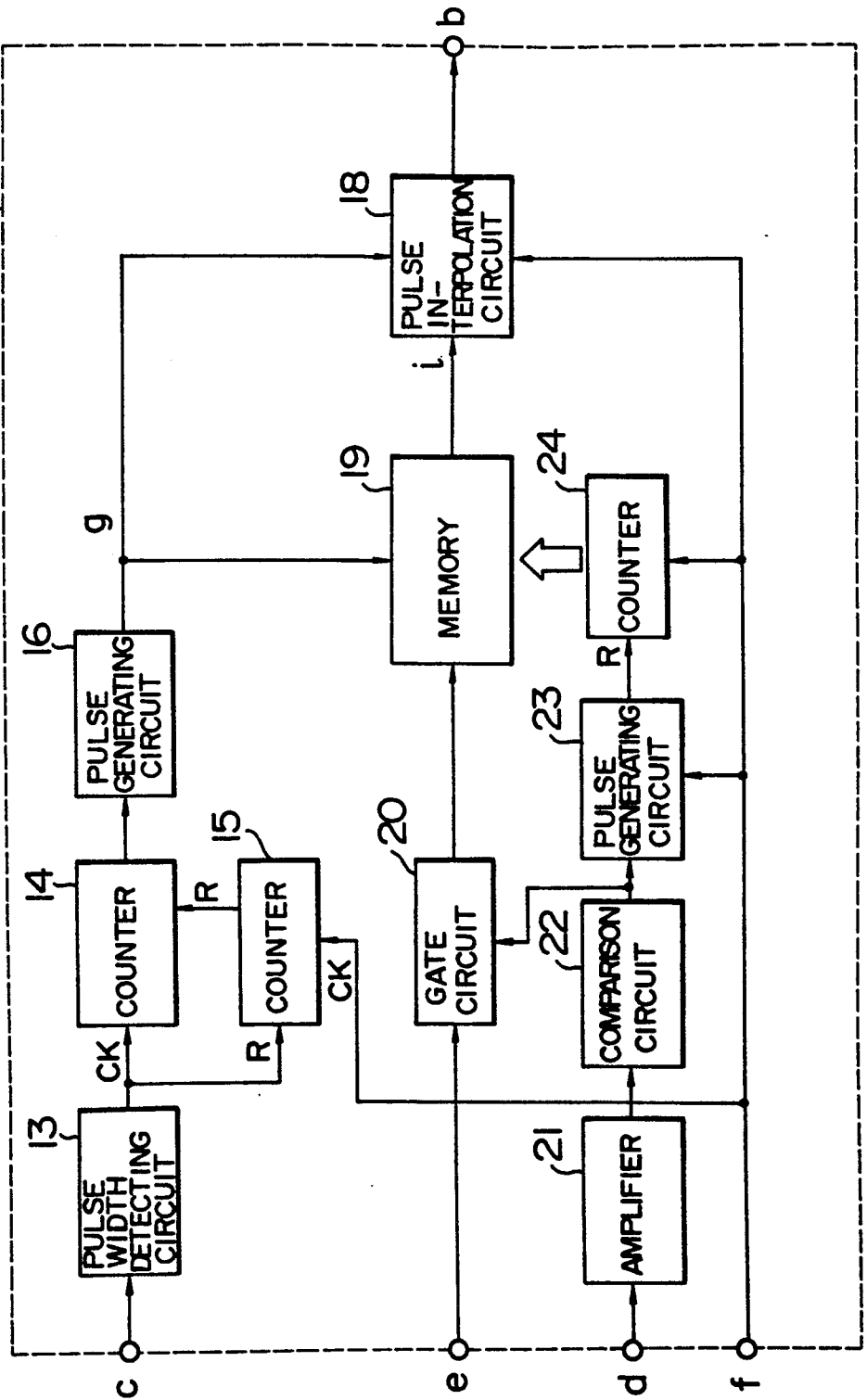
FIG. 8 is a block diagram showing an embodiment of the index mark detecting circuit used in an information recording and reproducing apparatus according to another embodiment of the invention.

In the above-described construction, as shown in FIG. 3, the signal from the pulse generating circuit 16 is delayed by the delay circuit 17 and then stored in the memory 19 so as to perform the desired interpolation only when the index signal is missing and this ensures that the missing of the index signal is preliminarily detected and the interpolation is effected at the desired timing even if the time base of the index signal to be reproduced is varied due to a variation in the rotation of the motor 4, vibration of the recording medium 1 or the optical head 3 of FIG. 2 or the like thus preventing the occurrence of erroneous interpolation. However, where there is no danger of causing any difficulty even if the timing of the interpolated index signal deviates from the proper timing, the delay circuit 17 may be eliminated and FIGS. 8 and 9 are block diagrams showing a construction for such case. In the Figures, the blocks designated by the same numerals as in FIGS. 3 and 4 perform the same functions and will not be described.

While, in the foregoing description, the apparatus operates so that the signal from the pulse generating circuit 16 is delayed by the delay circuit 17 and then stored in the memory 19 thus effecting the interpolation only when the index signal is missing, when storing the signal in the memory 19, if the index detecting means including the pulse width detecting circuit 13, the counters 14 and 15 and the pulse generating circuit 16 fails to detect the index mark due to a dropout of the recording medium 1 or if the index detecting means erroneously detects two or more pulses due to noise or the like, the still picture operation cannot be performed accurately. In order to prevent this, when storing the signal in the memory 19 during every revolution of the recording medium 1, it is only necessary to count the signal to be stored or the output signal of the delay circuit 17. Firstly, a description will be made of an operation in which the index detecting means erroneously detects two pulses. During the storing operation of the memory 19, the signal from the delay circuit 17 is applied to the T terminal of the flip-flop 32 in FIG. 5 so that when the first index mark is detected and applied to the flip-flop 32 through the delay circuit 17, the flip-flop 32 is set and its Q output goes to the logic "1". Then, when the second erroneous index mark is detected and applied to the flip-flop 32 through the delay circuit 17, the Q output of the flip-flop 32 changes from the logic "1" to "0" and this signal is applied to the T terminal of the flip-flop 33. When the signal at the T terminal of the flip-flop 33 changes from the logic "1" to "0", its Q output is set to the logic "1". The Q output of the flip-flop 33 is applied to the C terminal of the flip-flop 34 and thus at the same time that the C terminal of the flip-flop 34 goes to the logic "1" its $\overline{Q}$ output changes from the logic "1" to "0". When the Q output of the flip-flop 34 goes to the logic "0", the output of the AND circuit 35 goes to the logic "0" and the AND circuit 35 applies this logic "0" to the information processing control unit 7.

When the motor 4 is operated so that a position signal is detected by the position detecting element 9 and applied to the amplifier 21, the comparison circuit 22 and the pulse generating circuit 23 in this order, the pulse generating circuit 23 generates a pulse signal R thus clearing the flip-flops 32 and 33.

Figure 10:
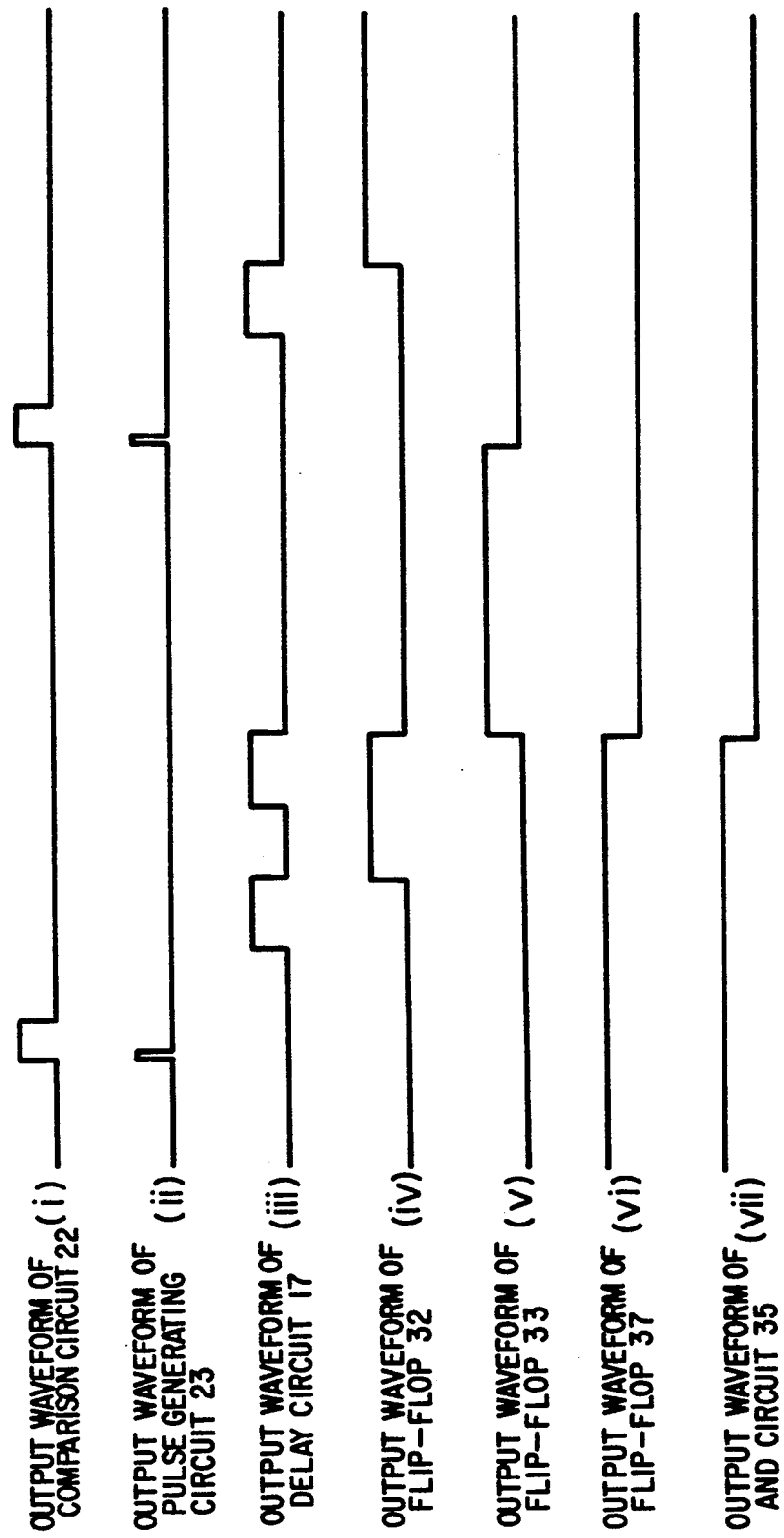
FIGS. 10 and 11 show various waveforms useful for explaining the operation of the invention.

When this occurs, the signal j from the AND circuit 35 remains in the logic "0" state and the information processing control unit 7 detects the occurrence of an abnormal condition. FIG. 10 shows various waveforms illustrating the above-mentioned operation. In the Figure, (i) shows the output waveform of the comparison circuit 22, (ii) the output waveform of the pulse generating circuit 23, (iii) the output waveform of the delay circuit 17, (iv) the output waveform at the Q terminal of the flip-flop 32, (v) the output waveform at the Q terminal of the flip-flop 33, (vi) the output waveform at the $\overline{Q}$ terminal of the flip-flop 34, and (vii) the output waveform of the AND circuit 35.

Secondly, a description will be made of an operation performed when the index detecting means fails to detect the index mark due to a dropout during storing of the signal from the delay circuit 17 in the memory 19.

Figure 11:
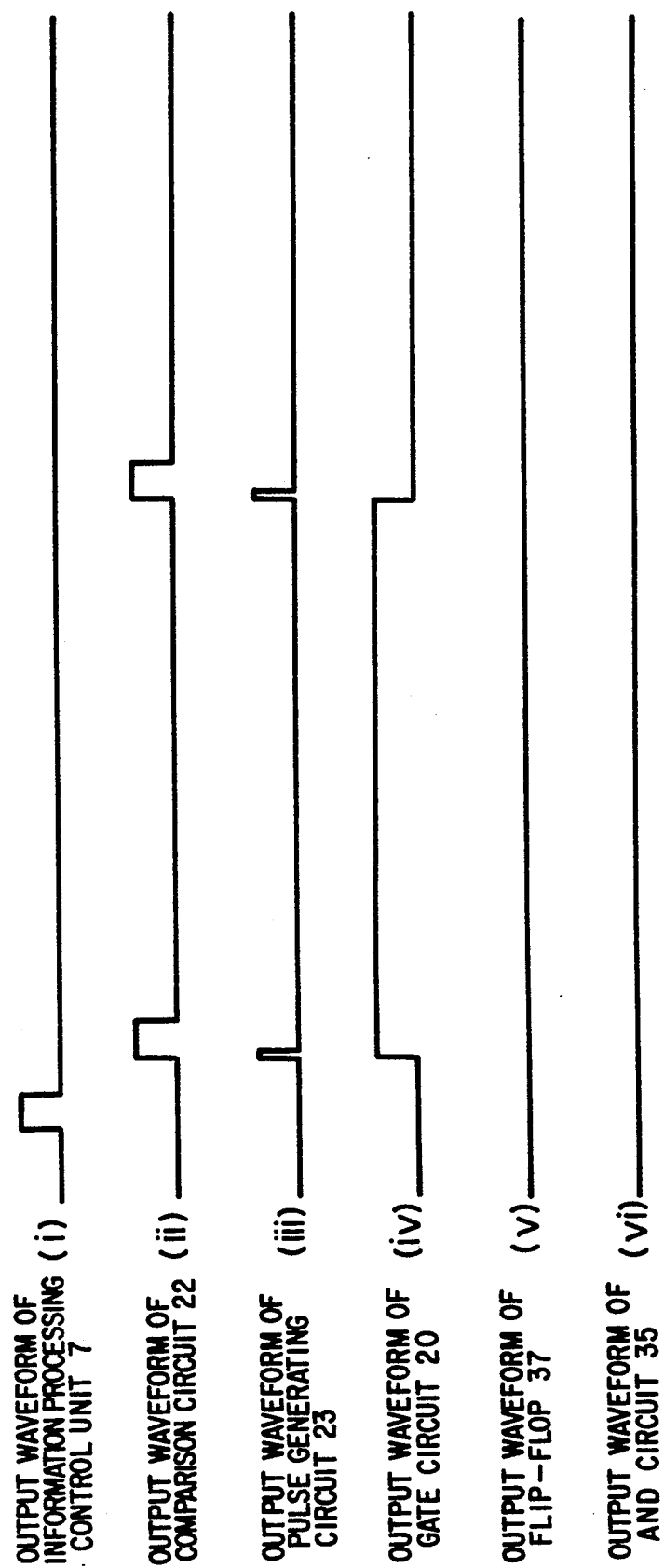

When the information processing control unit 7 of FIG. 2 applies a memory write start command to the gate circuit 20 and the counter 31 in the index mark detecting circuit 8, in response to the output of the position detecting element 9 applied through the amplifier 21 and the comparison circuit 22 the gate circuit 20 applies a logic "1" to the memory 19 thus placing the memory 19 in the write mode and simultaneously the flip-flops 34 and 37 of the counter 31 are cleared. Then, the motor 4 is rotated so that after one revolution the output of the position detecting element 9 is applied to the gate circuit 20 and the pulse generating circuit 23 through the amplifier 21 and the comparison circuit 22. The gate circuit 20 applies a logic "0" to the memory 19 and the write mode of the memory 19 is stopped. Also, the signal R from the pulse generating circuit 23 is applied to the C terminal of the flip-flop 37 so that the flip-flop 37 latches the state of the D terminal at the time of the positive-going transition of the C terminal. At this time, the D terminal is at the logic "0" so that the Q output of the flip-flop 37 goes to the logic "0" and this output is applied to the information processing control unit 7 through the AND circuit 35. FIG. 11 shows various waveforms illustrating the above-mentioned operation. In the FIG., (i) shows the signal (the line e) applied to the gate circuit 20 from the information processing control unit 7, (ii) the output waveform of the comparison circuit 22, (iii) the output waveform of the pulse generating circuit 23, (iv) the output waveform of the gate circuit 20, (v) the output waveform at the Q terminal of the flip-flop 37, and (vi) the output waveform of the AND circuit 35.

When the logic "0" is applied to the information processing control unit 7 from the AND circuit 35 as mentioned above, the information processing control unit 7 detects the occurrence of an abnormal condition so that the operation of the apparatus is stopped, the lamp is turned on or the storing operation of the memory 19 is performed again.

While, in the above-described embodiment, the index mark is preliminarily stored in the memory, the memory may be replaced with a counter or the like so as to preliminarily store the index mark.

Figure 12:
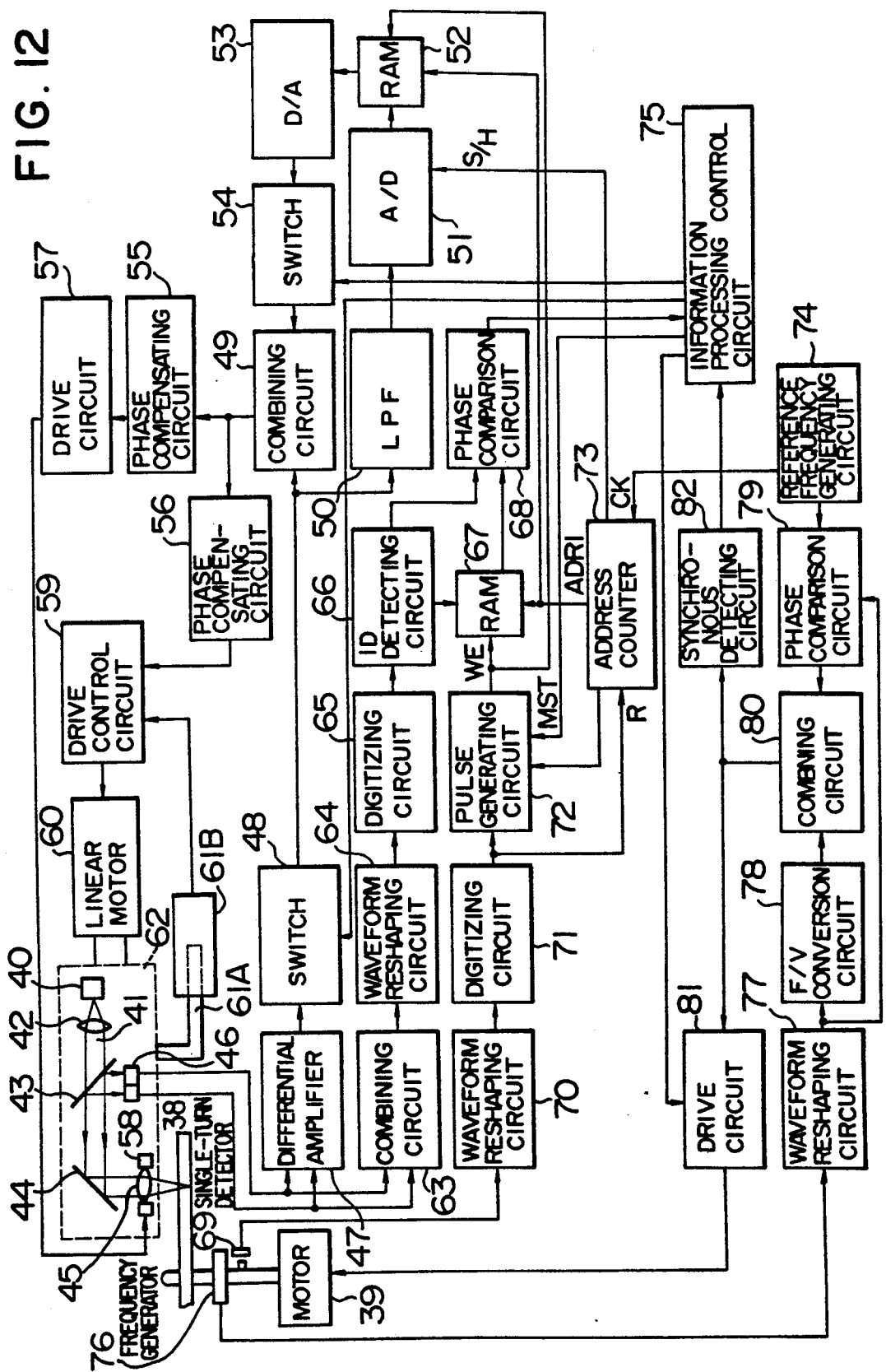
FIG. 12 is a block diagram of the information recording and reproducing apparatus according to the second embodiment of the invention.

FIG. 12 is a block diagram showing an information recording and reproducing apparatus according to a second embodiment of the invention. In the Figure, numeral 38 designates a recording medium including a recording material layer on an UV layer (ultraviolet layer) having a spiral groove of irregularities and formed on a base material such as acrylic resin and a protective layer formed on the recording material layer, with track address numbers and iD marks (index marks) being preliminarily recording on the groove successively from the outer periphery toward the inner periphery.

Numeral 39 designates a motor for rotating the recording medium 38 at a predetermined speed.

Numeral 40 designates a semiconductor laser, 41 a laser beam, 42 a coupling lens, 43 a beam splitter, 44 a reflecting mirror, 45 a converging lens, and 46 a light detector of a two-part structure. Numeral 47 designates a differential amplifier for amplifying the difference between two output signals of the light detector 46, and 48 a switch for switching on and off the output signal from the differential amplifier 47. The output of the switch 48 is applied to a combining circuit 49 and a low-pass filter 50, respectively. The signal from the low-pass filter 50 is applied to an A/D conversion circuit (analog-to-digital conversion circuit) 51 which in turn converts the input analog signal to a digital signal and stores it in an RAM (random access memory) 52. The digital signal stored in the RAM 52 is converted by a D/A conversion circuit (digital-to-analog conversion circuit) 53 and then applied to the combining circuit 49 through a switch 54. The combining circuit 49 combines the signal applied from the differential amplifier 47 through the switch 48 and the signal applied from the D/A conversion circuit 53 through the switch 54 and applies the combined signal to phase compensating circuits 55 and 56, respectively. The phase compensating circuit 55 is provided to compensate the phase of the system and it includes a filter or the like. The signal from the phase compensating circuit 55 is applied to a drive circuit 57 which in turn drives a tracking element 58.

Also, the phase compensating circuit 56 is provided for the purpose of compensating the phase of the system and it includes a filter or the like. The signal from the phase compensating circuit 56 is applied to a drive control circuit 59.

A speed detector 61 detects the feed speed of a slider 62 and it is composed of a movable part 61A and a stationary part 61B whose output is applied to the drive control circuit 59. The drive control circuit 59 controls a linear motor 60 in accordance with the output signals from the phase compensating circuit 56 and the speed detector 61.

The semiconductor laser 40, the coupling lens 42, the beam splitter 43, the reflecting mirror 44, the converging lens 45, the light detector 46, the tracking element 58 and the moving part 61A of the speed detector 61 are mounted on the slider 62 and so they are movable as a unit in the radial direction of the recording medium 38.

Numeral 63 designates a combining circuit for combining the two output signals of the light detector 46 and the signal from the combining circuit 63 is applied to a waveform reshaping circuit 64. The reshaped signal from the waveform reshaping circuit 64 is applied to a digitizing circuit 65 which in turn converts the input signal to a digital signal comprising "low" and "high" states. The thus converted digital signal is applied to an iD (index mark) detecting circuit 66 so that the iD detecting circuit 66 detects the iD mark from the applied digital signal and applies it to an RAM 67 and a phase comparison circuit 68.

Numeral 69 designates a single-turn detector for generating a single pulse signal for every revolution of the motor 39 and it includes a rotating part and a stationary part. The rotating part is rotatable along with the rotary shaft of the motor 39. The signal from the single-turn detector 69 is applied to a waveform reshaping circuit 70 so that the reshaped signal is applied to a digitizing circuit 71. The digitizing circuit 71 compares the applied signal with a level of a predetermined value and converts it to a digital signal of "low" and "high" states. The signal from the digitizing circuit 71 is applied to a pulse generating circuit 72 and an address counter 73. The pulse generating circuit 72 is responsive to a command from an information processing control circuit 75 to apply a storage command signal (a line WE) to the RAMs 52 and 67 during the interval of time that the motor 39 makes one revolution, that is, during the time that two pulse signals are applied from the digitizing circuit 71.

The address counter 73 receives as a reset signal (a line R) the signal applied from the digitizing circuit 71 and as clock signals (a line CK) the signals generated from a reference frequency generating circuit 74, so that when the reset signal (the line R) is received, all the counter outputs are cleared and the clock signal (a line CK) applied after the clearing is counted by the address counter 73 thereby applying its output as an address signal (a line ADR) to the RAMs 52 and 67. The phase comparison circuit 68 compares the phase of the iD mark detection signal from the iD detecting circuit 66 with the phase of the signal read from the RAM 67 and applies its result to the information processing control circuit 75.

A frequency generating circuit 76 generates a signal of a frequency proportional to the rotation speed of the motor 39 and it includes a rotating part and a stationary part. The rotating part is rotatable along with the rotating shaft of the motor 39. The signal from the frequency generating circuit 76 is applied to a waveform reshaping circuit 77 so that the reshaped signal from the waveform reshaping circuit 77 is applied to an F/V (frequency-to-voltage) conversion circuit 78 and a phase comparison circuit 79. The F/V conversion circuit 78 generates a voltage corresponding to the frequency of the input signal and applies the thus converted signal to a combining circuit 80. The phase comparison circuit 79 receives the signal generated from the reference frequency generating circuit 74 and the signal from the waveform reshaping circuit 77 so that a signal is generated in accordance with the phase difference between the two signals and the signal is applied to the combining circuit 80. The combining circuit 80 combines the signals applied from the F/V conversion circuit 78 and the phase comparison circuit 79 and applies the combined signal to a drive circuit 81 and a synchronous detection circuit 82. The drive circuit 81 is responsive to the input to drive the motor 39 and the synchronous detection circuit 82 detects whether the input signal is less than a predetermined voltage thereby applying the result to the information processing control circuit 75.

The information processing control circuit 75 controls the switches 48 and 54, the pulse generating circuit 72 and the drive circuit 81 in response to the signals applied from the phase comparison circuit 68 and the synchronous detection circuit 82.

The rotation control of the motor 39 will now be described. When the information processing control circuit 75 sends a motor rotation start command to the drive circuit 81, the drive circuit 81 controls the motor 39 to rotate. When the motor 39 starts rotating so that the frequency generating circuit 76 generates a signal of a frequency corresponding to the rotation speed of the motor 39, the signal is first reshaped by the waveform reshaping circuit 77 and then converted to a voltage corresponding to its frequency by the F/V conversion circuit 78. Also, the phase comparison circuit 79 generates a signal corresponding to the phase difference between the signals from the waveform reshaping circuit 77 and the reference frequency generating circuit 74 and the combining circuit 80 combines the signals applied from the F/V conversion circuit 78 and the phase comparison circuit 79 thus applying its output signal to the drive circuit 81. The drive circuit 81 controls the rotation of the motor 39 in response to the input voltage.

Thus, the motor 39 is controlled so as to maintain a predetermined relation between the frequency of the signal generated from the frequency generator 76 and the frequency of the signal from the reference frequency generating circuit 74 and thus the motor 39 is rotated at a predetermined speed. When the motor 39 is rotated at the predetermined speed, the output voltage of the combining circuit 80 attains a predetermined value and the synchronous detection circuit 82 sends to the information processing control circuit 75 a signal indicating that the motor 39 is rotating at the predetermined speed.

Next, the tracking control will be described. The light detector 46 has the two-part structure and the direction of its dividing line is the same with the track direction of the track pattern included in the laser beam 41 reflected from the recording medium 38. The respective signals from the light detector 46 are applied to the differential amplifier 47 which in turn amplifies and generates the difference between the input signals. When the information processing control circuit 75 turns on the switch 48, the output of the differential amplifier 47 is applied to the tracking element 58 through the switch 48, the combining circuit 49, the phase compensating circuit 55 and the drive circuit 57 and the tracking element 58 is moved in the radial direction of the recording medium 38 thus controlling the laser beam 41 to always scan the track. This control is called as the tracking control. Also, the signal from the combining circuit 49 is sent to the linear motor 60 through the phase compensating circuit 56 and the drive control circuit 59 and the linear motor 60 moves the slider 62 in the radial direction of the recording medium 38 thus controlling the movement of the tracking element 58 in such a manner that the output of the differential amplifier 47 is reduced to zero on an average, that is, the tracking element 58 is moved centering around the natural condition. The signal from the speed detector 61 for detecting the feed speed of the slider 62 is applied to the drive control circuit 59 thus performing a speed control to further stabilize the drive control of the linear motor 60.

Next, a description will be made of the operation of storing the signal from the tracking control system and the iD mark detection signal in the memory means and then applying the tracking control system signal stored in the memory means to the tracking control system and the feed control system.

Figure 13:
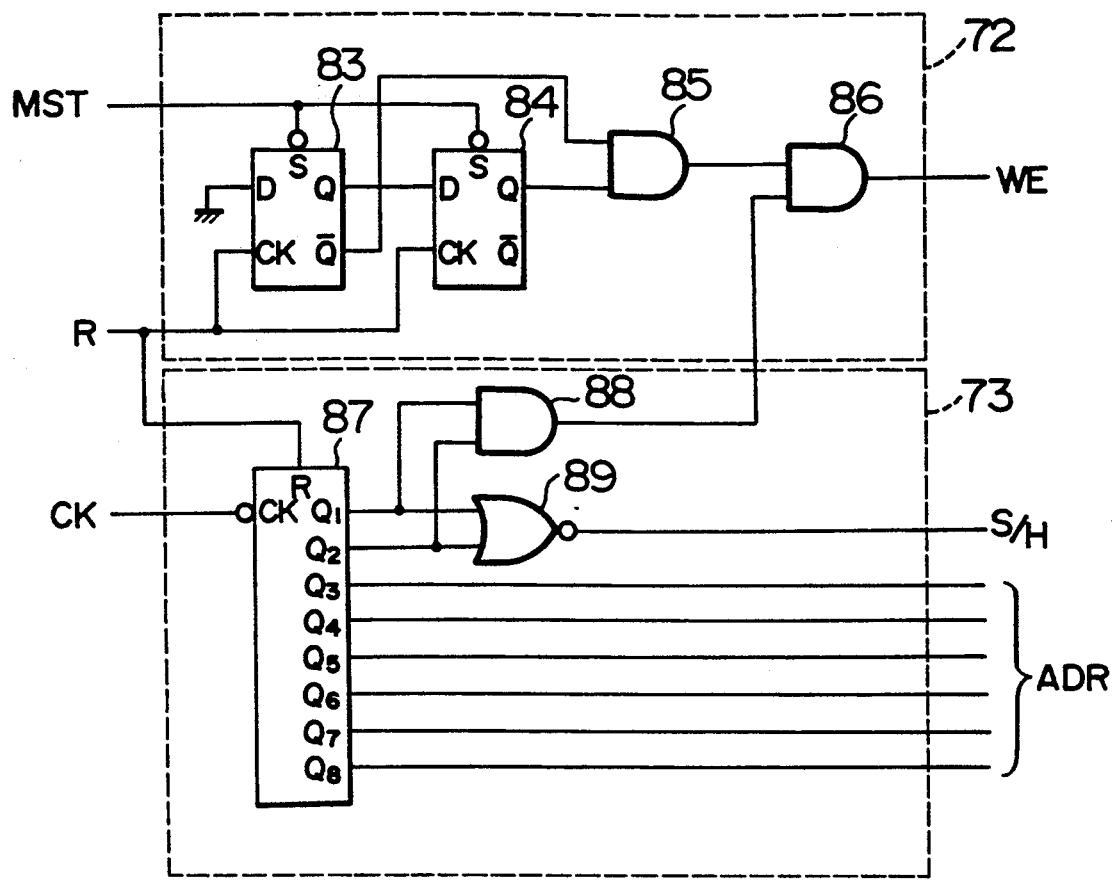
FIG. 13 is a circuit diagram showing an embodiment of the pulse generating circuit in FIG. 12.

Referring first to FIG. 13, there is illustrated a detailed circuit construction of the pulse generating circuit 72 and the address counter 73. In FIGS. 12 and 13, the signal (the line MST) generated from the information processing control circuit 75 is applied to the set terminal of flip-flops 83 and 84 and the signal (the line R from the digitizing circuit 71 is applied to the clock terminal of the flip-flops 83 and 84 and the reset terminal of a counter 87. The signal (the line CK) generated from the reference frequency generating circuit 74 is applied to the clock terminal of the counter 87. The flip-flop 83 has its D terminal connected to the ground, its Q terminal connected to the D terminal of the flip-flop 84 and its $\overline{Q}$ terminal connected to one input of an AND gate 85. The flip-flop 84 has its Q terminal connected to the other input of the AND gate 85 whose output is connected to one input of an AND gate 86 and the counter 87 has its $Q_1$ terminal connected to one input of an AND gate 88 and to one input of a NOR gate 89 and its $Q_2$ terminal connected to the other input of the AND gate 88 and to the other input of the NOR gate 89. The output of the AND gate 88 is connected to the other input of the AND gate 86. Also, the output signal (the line WE) of the AND gate 86 is applied to the RAMs 52 and 67 and the output signal (a line S/H) of the NOR gate 89 is applied to the A/D conversion circuit 51. The $Q_3$ to $Q_8$ signals (the line ADR) from the counter 83 are applied as an address to the RAMs 52 and 67, respectively.

Figure 14:
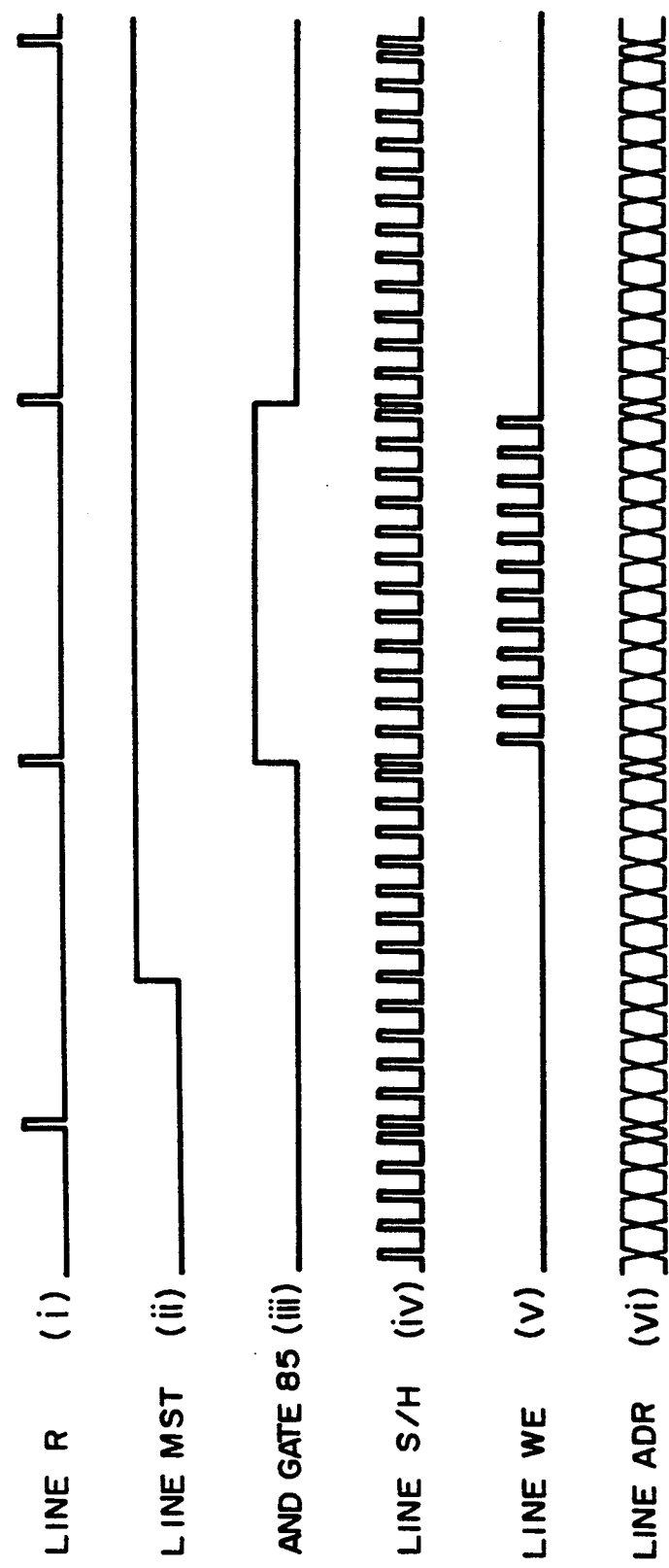
FIG. 14 shows various waveforms useful for explaining the operation of the circuits in FIGS. 12 and 13.

In this way, when the information processing control circuit 75 applies an operation command to the drive circuit 81 and the switch 48, respectively, the motor 39 is rotated at the predetermined speed and the tracking control is performed. In this condition, when the information processing control circuit 75 applies a high-level storage start signal (the line MST) to the pulse generating circuit 72, at the instant that the signal from the single-turn detector 69 is applied to the pulse generating circuit 72 through the waveform reshaping circuit 70 and the digitizing circuit 71 the $\overline{Q}$ output of the flip-flop 83 changes from the "low" level to the "high" level. Thus, the output of the AND gate 86 goes to the "high" level. Also, the $Q_1$ to $Q_8$ outputs of the counter 87 are all cleared by the signal from the digitizing circuit 71 so that the signal (the line CK) from the reference frequency generating circuit 74 is counted and the pulse generating circuit 72 applies a signal (the line WE) to the RAM 67. The address counter 73 also applies a sample and hold signal (the line S/H) to the A/D conversion circuit 51 and an address signal (the line ADR) to the RAMs 52 and 67. FIG. 14 shows various waveforms illustrating this operation. In the Figure, (i) shows the output signals (the line R) of the digitizing circuit 71, (ii) the signal (the line MST) applied from the information processing control circuit 75 to the pulse generating circuit 72, (iii) the output signal of the AND gate 85, (iv) the signal (the line S/H) applied from the address counter 73 to the A/D conversion circuit 51, (v) the signal (the line WE) applied from the pulse generating circuit 72 to the RAMs 52 and 67, and (vi) the signal (the line ADR) applied from the address counter 73 to the RAMs 52 and 67.

The A/D conversion circuit 51 samples the analog signal applied from the low-pass filter 50 when the signal (the line S/H) applied from the address counter 73 goes to the "high" level and holds when the signal (the line S/H) goes to the low level thus effecting A/D conversion and applying a digital signal corresponding to the magnitude of the input analog signal to the RAM 52. When the signal (the line WE) applied from the pulse generating circuit 72 goes to the "high" level, the RAM 52 stores the digital signal applied from the A/D conversion circuit 51 at the address of the signal (the line ADR) applied from the address counter 73. On the other hand, the signal reproduced by the light detector 46 and the combining circuit 63 is applied to the iD detecting circuit 66 through the waveform reshaping circuit 64 and the digitizing circuit 65 so that the RAM 67 stores the output signal of the iD detecting circuit 66 in the like manner as the RAM 52.

The signal of the tracking control system is practically composed of the components synchronized with the rotation of the motor 39, particularly the rotation component of the motor 39. Thus, in the condition where the switch 48 is on and the switch 54 is off with the tracking control and the feed control being in operation, the loop gain of the tracking control system is not sufficient due to the eccentricity of the recording medium 38, the eccentricity of the shaft of the motor 39, etc., and the laser beam 41 does not satisfactorily follow the given track on the recording medium 38. This causes a tracking error and a signal (mainly the component synchronized with the rotation period) corresponding to the tracking error is generated from the differential amplifier 47. The tracking error signal from the differential amplifier 47 is stored in the RAM 52 through the switch 48, the low-pass filter 50 and the A/D conversion circuit 51. Then, when the signal from the single-turn detector 59 is applied to the pulse generating circuit 72 and the address counter 73 through the waveform reshaping circuit 70 and the digitizing circuit 71, the pulse generating circuit 72 stops the write signal (the line WE) applied to the RAMs 52 and 67. Thus, the signals from the differential amplifier 47 and the iD detecting circuit 66 are respectively stored digitally in the RAMs 52 and 67 in synchronism with the rotation of the motor 39.

Next, the operation of reading the signals stored in the RAMs 52 and 67 will be described.

When the signal (the line WE) from the pulse generating circuit 72 goes to the "low" level, the RAMs 52 and 67 are placed in the read mode. The address counter 73 clears all of its outputs each time the signal (the line R) is applied from the digitizing circuit 71 so that when the signal (the line CK) is applied from the reference frequency generating circuit 74, the signal is counted up and the resulting counter output signal (the line ADR) is applied as an address signal to the RAMs 52 and 67. This allows the RAMs 52 and 67 to repeatedly read the digital signals in synchronism with the rotation of the motor 39. When the information processing control circuit 75 turns on the switch 54, the digital signal read from the RAM 52 is applied to the D/A conversion circuit 53 for conversion to an analog signal and the D/A conversion circuit 53 applies the thus converted analog signal to the combining circuit 49 through the switch 54. Thus, the combining circuit 49 combines the signals from the switches 48 and 54 and applies the combined signal to the phase compensating circuits 55 and 56, respectively. Of course, it is so selected that when the switch 54 is off, the level of the signal from the D/A conversion circuit 53 is substantially the same with the level of the signal from the differential amplifier 47.

When the signal from the D/A conversion circuit 53 is applied to the tracking control system, the laser beam 41 is moved so as to practically follow the eccentricity of the recording medium 38 and thus the component synchronized with the rotation of the motor 39 is decreased considerably in the signal from the differential amplifier 47.

Figure 15:
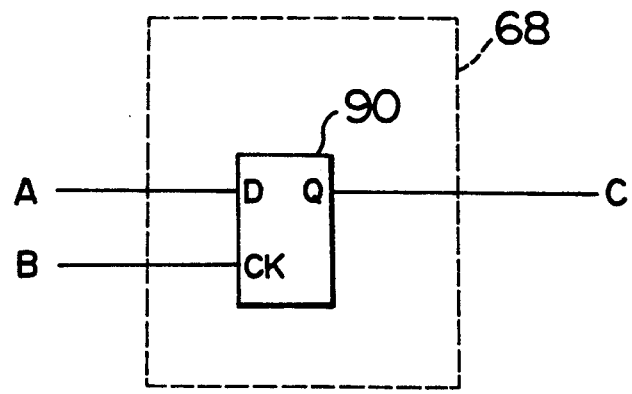
FIG. 15 is a circuit diagram showing an embodiment of the phase comparison circuit in FIG. 12.

On the other hand, the signal read from the RAM 67 is applied to the phase comparison circuit 68. The phase comparison circuit 68 compares in phase the signal from the iD detecting circuit 66 and the signal from the RAM 67. FIG. 15 shows a detailed circuit construction of the phase comparison circuit 68.

Referring to FIGS. 12 and 15, the signal from the iD detecting circuit 66 is applied to the D terminal of a flip-flop 90 through an input terminal A of the phase comparison circuit 68 and the signal from the RAM 67 is applied to the CK terminal of the flip-flop 90 through an input terminal B of the phase comparison circuit 68. Also, the output Q of the flip-flop 90 is applied to the information processing control circuit 75 through an output terminal C.

The phase comparison circuit 68 detects the rotation phase of the motor 39 and the rotation phase of the recording medium 38 by performing a relative phase comparison between the signal of the iD detecting circuit 66 stored in the RAM 67 and the signal from the single-turn detector 69. FIG. 16 shows various waveforms useful for explaining the operation of the phase comparison circuit 68. In the Figure, (i) shows the output signal of the digitizing circuit 71, (ii) the first waveform produced by the iD detecting circuit 66 upon detection of the iD mark, (iii) the second waveform produced by the iD detecting circuit 66 and changing from the "low" to the "high" level during the "high" level of the first waveform, (iv) the signal read from the RAM 67, and (v) the output signal of the phase comparison circuit 68.

If the motor 39 and the recording medium 38 are held in the same phase relation as during the recording, when the CK terminal of the flop-flop 90 changes from the "low" to the "high" level, its D terminal is always at the "high" level and thus the Q output of the flip-flop 90 is at the "high" level. However, if vibrations or the like are externally applied to the apparatus so that the rotation phases of the motor 39 and the recording medium 38 deviate, when the CK terminal of the flip-flop 90 changes from the "low" to the "high" level, the D terminal of the flip-flop 90 goes to the "low" level and its Q output goes to the "low" level. The Q output of the flip-flop 90 is sent to the information processing control circuit 75 which in turn detects that the rotational phases of the motor 39 and the recording medium 38 have deviated.

If the rotation phases of the motor 39 and the recording medium 38 deviate relative to those during the storing of the RAMs 52 and 57, since the signal from the D/A conversion circuit 53 is externally applied to the tracking control system, this signal becomes a disturbance thus disturbing the tracking control and the feed control and it also causes runaway of these controls in a worse case. In order to prevent such operation, the information processing control circuit 75 is responsive to the signal from the phase comparison circuit 68 to detect the deviation of the rotation phase and turn off the switch 54 thereby preventing the signal from the D/A conversion circuit 53 from being sent to the combining circuit 49.

Thereafter, in order to perform again the storing operation of the RAMs 52 and 67 in the previously mentioned manner, the information processing control circuit 75 applies a storage start command signal (the line MST) to the pulse generating circuit 72 so that after the signals have been stored in the RAMs 52 and 67, respectively, during the time interval for one revolution of the recording medium 38, the switch 54 is again turned on so that the D/A conversion circuit 53 converts the restored digital signal from the RAM 54 to an analog signal and applies it to the combining circuit 49 through the switch 54. Thus, as mentioned previously, in response to the signal from the D/A con version circuit 53 the laser beam 41 is moved so as to practically follow the eccentricity of the recording medium 38 and the eccentricity is relatively reduced thus allowing the laser beam 41 to accurately follow the track.

Figure 17:
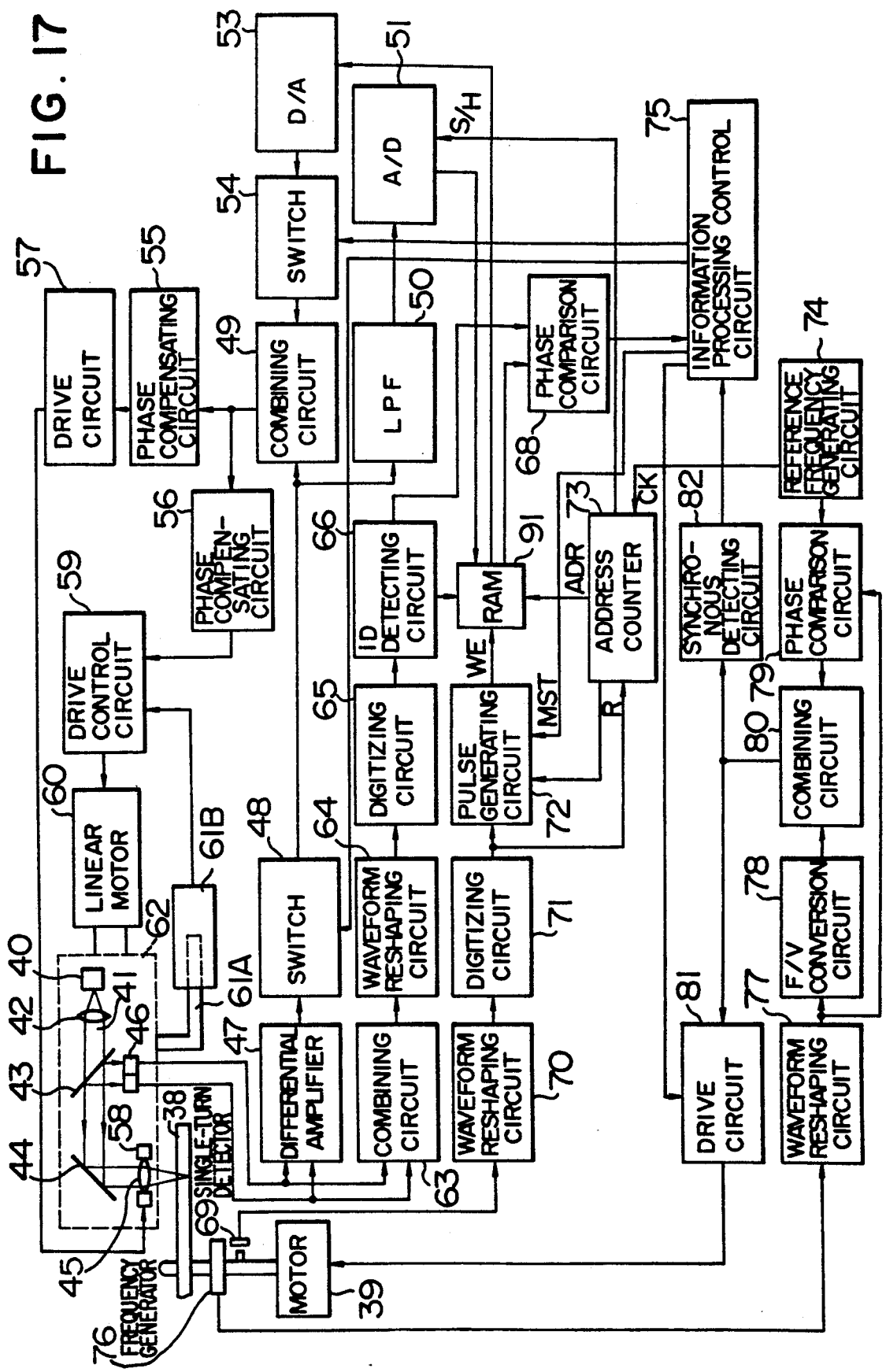

While, in the above-described embodiment, the RAMs 52 and 67 are used, the same effect can be obtained with single storing means. FIGS. 17 and 18 are block diagrams showing another embodiment of the invention for such purposes. The same component parts as in FIG. 12 are designated by the same reference numerals and will not be described. In FIGS. 17 and 18, the signal from the digitizing circuit 65 is applied to the iD detecting circuit 66 through an input terminal a and the first signal from the iD detecting circuit 66 is applied to the input $i_1$ of an RAM 91. The second signal from the iD detecting circuit 66 is applied to the phase comparison circuit 68. The signal from the low-pass filter 50 is applied to the inputs $i_2$ to $i_7$ of the RAM 91 through an input b and the A/D conversion circuit 51. The RAM 91 is responsive to the signal (the line WE ) applied from the pulse generating circuit 72 to store the signals at the input terminals $i_1$ to $i_7$ in the internal register designated by the signal ADR from the address counter 73 and the RAM 91 delivers the contents of the internal register having the address designated by the signal (the line ADR) to its output terminals $0_1$ to $0_7$. The signals $0_2$ to $0_7$ from the RAM 91 are converted to an analog signal by the D/A conversion circuit 53 and applied to the switch 54 through an output terminal d.

In the condition where the tracking control is in operation in the like manner as mentioned previously, after a storage start signal has been applied to the pulse generating circuit 72 from the information processing control circuit 75, when the signal from the singleturn detector 69 is applied to the pulse generating circuit 72 through the waveform reshaping circuit 70 and the digitizing circuit 71, the pulse generating circuit 72 applies a signal (the line WE) to the RAM 91. When the signal (the line WE) is applied, the RAM 91 stores the signals from the iD detecting circuit 66 and the A/D conversion circuit 51 at the address value designated by the signal (the line ADR) from the address counter 73. Thereafter, when the signal from the reference frequency generating circuit 74 is applied, the address counter 73 counts up. At this time, the signal (the line WE) from the pulse generating circuit 72 is synchronized with the signal (the line ADR) from the address counter 73 counting the signal from the reference frequency generating circuit 74 so that the address counter 73 is operated to count up after the signal (the line WE) has been generated from the pulse generating circuit 72. The above operation is performed repeatedly and when the signal from the single-turn detector 69 is applied to the pulse generating circuit 72 through the waveform reshaping circuit 70 and the digitizing circuit 71, the pulse generating circuit 72 stops the write signal (the line WE) applied to the RAM 91. In this way, the signals from the differential amplifier 47 and the iD detecting circuit 66 are digitally stored in the RAM 91 in synchronism with the rotation of the motor 39.

When the signal (the line WE) from the pulse generating circuit 72 goes to the "low" level, the RAM 91 is placed in the read mode and the digital signals are repeatedly read out in synchronism with the rotation of the motor 39. The digital signal ($0_2$ to $0_7$) read from the RAM 91 is applied to the D/A conversion circuit 53 for conversion to an analog signal and the D/A conversion circuit 53 applies the converted analog signal to the combining circuit 49 through the switch 54. As a result, the laser beam 41 practically follows the eccentricity of the recording medium 38 and the tracking error is reduced.

On the other hand, the digital signal ($0_1$) read from the RAM 91 is applied to the phase comparison circuit 68 which in turn compares the phase of the second signal from the iD detecting circuit 66 with that of the digital signal ($0_1$) from the RAM 91. Thus, the phase comparison circuit 68 detects the rotation phase of the motor 39 and the rotation phase of the recording medium 38 through the relative phase comparison between the signal of the iD detecting circuit 66 stored in the RAM 91 and the signal from the single-turn detector 69.

Then, when vibrations or the like are externally applied to the apparatus so that the rotation phases of the motor 39 and the recording medium 38 deviate, in the like manner as mentioned previously the phase comparison circuit 68 informs the information processing control circuit 75 that the rotation phases of the motor 39 and the recording medium 38 are deviated. When this occurs, the information processing control circuit 75 turns off the switch 54 so that the signal from the D/A conversion circuit 53 is not applied to the combining circuit 49 and the storing operation of the RAM 91 is again performed in the same manner as mentioned previously. Then, the switch 54 is again turned on so that the digital signal ($0_2$ to $0_7$) from the RAM 91 is converted to an analog signal by the D/A conversion circuit 53 and this analog signal is applied to the combining circuit 49 through the switch 54. Thus, in the like manner as the previously mentioned embodiment, in response to the signal from the D/A conversion circuit 53 the laser beam 41 is moved so as to practically follow the eccentricity of the recording medium 38 and it accurately follows the track.

As described hereinabove, the same intended effects of the invention are attained by the construction using the single memory and the simplification of the construction is attained.

Also, during the storing operation of the RAM 52 or 91, if a shock or vibrations are applied externally so that the rotation of the motor 39 is disturbed causing the synchronous detection circuit 82 to detect a non-synchronous condition, the laser beam 41 is caused to skip the given track of the recording medium 38 or the measurement of the storing time by the counter shows that the storing time is shorter than the time for one revolution of the recording medium 38, the storing operation of the RAM 52 or 91 is performed again. Then, if the same phenomenon occurs again, it is an indication that the apparatus is malfunctioning and the operation of the apparatus is stopped.

Also, while the RAMs 52 and 91 perform the storing operation during the time that the motor 39 makes one revolution, the storage time of the RAMs 52 and 67 should preferably be selected longer than the time for one revolution of the motor 39 in consideration of jitter, etc., of the motor 39.

From the foregoing description it will be seen that in accordance with the invention, when preliminarily recording a reproduced index signal in a memory, if the index signal is missing or two or more index signals are detected during the time that a recording medium makes one revolution, a warning of abnormal condition is given and the operation of the apparatus is stopped. Also, the storing operation of the memory is performed again so that after the completion of the storing operation of the memory, if dropout of the index signal occurs due to foreign particles, dirt, etc., on the recording medium, the desired index signal is interpolated by the stored signal and in this way the still picture operation is performed stably.

Also, if the phase relation between the motor and the recording medium deviates from the correct relation due to a shock, skip, vibrations, temperature change or the like, the resulting tracking error is again stored in the memory and the stored signal is applied to the tracking control system thereby always performing the desired tracking control and feed control. Thus, the present invention provides an information recording and reproducing apparatus which is high in reliability.

We claim:

1. A system for detecting a rotational deviation of a disk-shaped recording medium relative to a motor which rotates said recording medium in an apparatus for reproducing information from the recording medium, the recording medium including an information track having signals including a rotational position indicating signal recorded thereon, said system comprising:

motor control means for controlling a rotating shaft of said motor to rotate at a predetermined rotation speed;

a frequency generator means, which includes a rotating part and a stationary part, said rotating part being adapted to be fixed to the rotating shaft of said motor, for detecting a rotating position of said motor and generating an output signal indicating every complete revolution of said rotating shaft of said motor;

signal reproducing means for providing an output signal which is a reproduction of said signals recorded on said information track of said recording medium;

rotational signal detecting means for detecting said rotational position indicating signal from the output signal of said signal reproducing means and providing an output signal indicating detection of said rotational position indicating signal;

memory means for storing the output signal of said rotational signal detecting means and outputting the stored signal;

system control means for generating an instruction signal which is in synchronism with said output signal of sad frequency generator means and is provided to said memory means to cause said output signal of said rotational signal detecting means to be stored in said memory means and to be output from said memory means as a memory means output signal in synchronism with the output signal of said frequency generator means; and rotational deviation detecting means comprising a phase comparison circuit for performing a phase comparison between the output signal of said rotation signal detecting means and the memory means output signal and generating an output signal, based on said phase comparison, indicating whether a rotational deviation exists between said recording medium and said motor.

2. A system according to claim 1, wherein said system control means receives the output signal from said rotational deviation detecting means and generates another said instruction signal to cause said memory means to store against said output signal of said rotational signal detecting means when said output signal from said rotational deviation detecting means indicates that a rotational deviation exists between said recording medium and said motor.

3. A system according to claim 1, wherein said system control means includes a storing gate pulse generating means and a time measuring means, said storing gate pulse generating means generating a storing gate pulse as part of sad instruction signal for causing said memory means to store said output signal from said rotational signal detecting means, said time measuring means starting measuring a storing time period after said storing gate pulse is generated and generating a stop instruction signal when the storing time period is longer than a time period required for one revolution of said motor, and said storing gate pulse generating means generating said storing gate pulse is response to the output signal of said frequency generator means and terminating said storing gate pulse in response to said stop instruction signal from said time measuring means.

4. A system according to claim 1, wherein said system control means includes a storing gate pulse generating means and a time measuring means, said storing gate pulse generating means generating a storing ate pulse during a time period required for one revolution of said motor in response to the output signal of said frequency generator means for causing said memory means to store said output signal from said rotational signal detecting means, said time measuring means measuring a storing time period of said storing gate pulse and generating a warning signal when the storing time period is shorter than a time period required for one revolution of said motor, and said storing gate pulse generating means generating again said storing gate pulse in response to said warning signal from said time measuring means.

5. An apparatus for reproducing information from an information track formed in a disk-shaped recording medium, said information track having signals including a rotational position indicating signal recorded thereon, said apparatus comprising:

optical means for causing an incident radiation beam to impinge upon the recording medium;

a motor control means for controlling a rotating shaft of said motor to rotate said recording medium at a predetermined rotation speed;

a frequency generator means, which includes a rotating part and a stationary part, said rotating part being adapted to be fixed to the rotating shaft of said motor, for detecting a rotating position of said motor and generating an output signal indicating every complete revolution of said rotating shaft of said motor;

signal reproducing means for reproducing information from said radiation beam after it is reflected from said recording medium to provide an output signal which is a reproduction of said signals recorded on said information track of said recording medium;

rotational signal detecting means for detecting said rotational position indicating signal from the output signal of said signal reproducing mean and providing an output signal indicating detection of said rotational position indicating signal;

first memory means for storing the output signal of said rotational signal detecting means and outputting a stored signal as a first memory means output signal;

track-deviation detecting means for detecting a positional deviation between said incident radiation beam and said information track and providing an output signal representing said positional deviation;

transfer means for moving said incident radiation beam across said information track;

second memory means for storing said output signal from said track-deviation detecting means in said tracking operation mode and outputting a stored signal as a second memory means output signal;

tracking control means, responsive to said output signal from said trackdeviation detection means, for controlling said transfer means to position said incident radiation beam in alignment with said information track during a tracking operation mode;

rotational deviation detecting means comprising a phase comparison circuit for performing a phase comparison between the output signal of said rotation signal detecting means and the first memory means output signal, and generating an output signal, based on said phase comparison, indicating whether a rotational deviation exists between said recording medium and said motor; and said tracking control means including an adding circuit for adding said output signal from said track-deviation detection means and said second memory means output signal to provide an addition result signal based thereon, and for controlling said transfer means, responsive to said addition result signal, to position said incident radiation beam in alignment with said information track during said tracking operation mode;

system control means for generating and providing a storing instruction signal to said first memory and said second memory means for causing said first memory means to store said output signal of said rotational signal detecting means and aid second memory means to store said output signal of said trackdeviation detection means, and for generating an outputting instruction signal which is in synchronism with said output signal of said frequency generator means and is provided to said first memory and a second memory means for causing first memory means and said second memory means to store said output signal of said rotational signal detecting means and said output signal of said track-deviation detection means, respectively, and to output said first memory means output signal and said second memory means output signal, respectively, in synchronism with the output signal of said frequency generator means;

said system control means terminating said outputting instruction signal responsive to receipt of a said output signal from said rotational deviation detecting means indicating that a rotational deviation exists between said recording medium and said motor to cause said second memory means to terminate outputting of said second memory means output signal, whereby said tracking control means controls said transfer means to move the incident radiation beam responsive to said output signal from said track-deviation detection means.

6. An apparatus for reproducing information from an information track formed in a disk-shaped recording medium, said information track having signals including a rotational position indicating signal recorded thereon, said apparatus comprising:

an optical mean for causing an incident radiation beam to impinge upon the recording medium;

a motor control means for controlling a rotating shaft of said motor to rotate said recording medium at a predetermined rotation speed;

a frequency generator means, which includes a rotating part and a stationary part, said rotating part being adapted to be fixed to the rotating shaft of said motor, for detecting a rotating position of said motor and generating an output signal indicating every complete revolution of said rotating shaft of said motor;

signal reproducing means for reproducing information from said radiation beam after it is reflected from said recording medium to provide an output signal which is a reproduction of said signals recorded on said information track of said recording medium;

rotational signal detecting means for detecting said rotational position indicating signal from the output signal of said signal reproducing means and providign an output signal indicating detection of said rotational position indicating signal;

first memory means for storing the output signal of said rotational signal detecting means and outputting a stored signal as a first memory means output signal;

track-deviation detection means for detecting a positional deviation between said incident radiation beam and said information track and providing an output signal representing said positional deviation;

transfer means for moving said incident radiation beam across said information track;

second memory means for storing said output signal from said track-deviation detection means in said tracking operation mode and outputting a stored signal as a second memory means output signal;

tracking control means, responsive to said output signal from said track-deviation detection means, for controlling said transfer means to position said incident radiation beam in alignment with said information track during a tracking operation mode;

said tracking control means including an adding cicuit for adding said output signal from said track-deviation detection means and said second memory means output signal to provide an addition result signal based thereon, and for controlling said transfer means, responsive to said addition result signal, to position said incident radiation beam in alignment with said information track during said tracking operation mode;

rotational deviation detecting means comprising a phase comparison circuit for performing a phase comparison between the output signal of said rotational signal detecting means and the first memory means output signal, and generating an output signal, based on said phase comparison, indicating whether a rotational deviation exists between said recording medium and said motor; and system control means for generating and providing a storing instruction signal to said first memory means and said second memory means for causing said first memory means to store said output signal of said rotational signal detecting means and said second memory means to store said output signal of said track-deviation detection means and for generating an outputting instruction signal which is in synchronism with said output signal of said frequency generator for means and is provided to said first memory means and said second memory means for causing said first memory means and said second memory means to store said output signal of said rotational signal detecting means and said output signal of said track-deviation detection means, respectively, and to output said first memory means output signal and said second memory means output signal, respectively, in synchronism with the output signal of said frequency generator means, said system control means receiving the output signal from said rotational deviation detecting means and generating said storing instruction signal responsive to a said output signal from said rotational deviation detecting means indicating that a rotational deviation exists between said recording medium and said motor to cause said first memory means to store again said output signal of said rotational signal detecting means and said second memory means to terminate outputting of said second memory means output signal and to store again said output signal from said track-deviation detection means.

* * * * *